US010784958B2

(12) United States Patent
Eiselt

(10) Patent No.: US 10,784,958 B2
(45) Date of Patent: Sep. 22, 2020

(54) METHOD AND DEVICE OF DETERMINING A TIME-OF-FLIGHT OF AN OPTICAL SIGNAL BETWEEN A STARTING POINT OF AN OPTICAL PATH AND A REFLECTION POINT WITHIN THE OPTICAL PATH

(71) Applicant: ADVA OPTICAL NETWORKING SE, Meiningen (DE)

(72) Inventor: Michael Eiselt, Kirchheim (DE)

(73) Assignee: ADVA OPTICAL NETWORKING SE, Meiningen (DE)

( * ) Notice: Subject to any disclaimer, the term of this patent is extended or adjusted under 35 U.S.C. 154(b) by 0 days.

(21) Appl. No.: 16/433,079

(22) Filed: Jun. 6, 2019

(65) Prior Publication Data
US 2019/0379451 A1  Dec. 12, 2019

(30) Foreign Application Priority Data
Jun. 7, 2018  (EP) .................................... 18176655

(51) Int. Cl.
*H04B 10/071*  (2013.01)
*H04B 10/25*  (2013.01)
(Continued)

(52) U.S. Cl.
CPC ........... *H04B 10/071* (2013.01); *H04B 10/25* (2013.01); *H04L 1/0071* (2013.01); *H04L 7/0075* (2013.01)

(58) Field of Classification Search
None
See application file for complete search history.

(56) References Cited

U.S. PATENT DOCUMENTS

2005/0285058 A1* 12/2005 Beller .................... H04B 10/07
250/559.38
2006/0227315 A1* 10/2006 Beller .................... G01S 17/26
356/3

(Continued)

FOREIGN PATENT DOCUMENTS

EP  1712888 A1  10/2006
EP  1565718 B1  3/2010
(Continued)

OTHER PUBLICATIONS

Wang et al., "Long-range and high-precision correlation optical time-domain reflectometry utilizing an all-fiber chaotic source", Jun. 4, 2015, Optics Express, vol. 23, No. 12, pp. 15514-15520 (Year: 2015).*

(Continued)

*Primary Examiner* — David W Lambert
(74) *Attorney, Agent, or Firm* — Perry + Currier, Inc.

(57) ABSTRACT

The invention relates to a method of determining a time-of-flight of an optical signal between a starting point and a reflection point of an optical path, comprising: supplying to the path at least one optical probing signal; detecting an electrical return signal according to an optical return signal returning from the path in response to a corresponding one of the probing signals using direct detection; deriving at least one receive code sequence by sampling and slicing the return signal using a sampling rate corresponding to a bit rate of a sequence of pulses of the probing signal; determining a correlation function by correlating the transmit code sequence and the at least one receive code sequence; and identifying a main peak of the correlation function that corresponds to the reflection point and a time position of the peak, and determining the time-of-flight as the time position of the peak.

34 Claims, 14 Drawing Sheets

(51) Int. Cl.
*H04L 1/00* (2006.01)
*H04L 7/00* (2006.01)

(56) References Cited

U.S. PATENT DOCUMENTS

| | | | | |
|---|---|---|---|---|
| 2015/0260831 A1* | 9/2015 | Lewis | ................... | G01S 17/10 |
| | | | | 356/4.01 |
| 2016/0277101 A1* | 9/2016 | Jiang | ................. | H04B 10/0775 |
| 2017/0205255 A1* | 7/2017 | Nannipieri | ......... | G01D 5/35361 |

FOREIGN PATENT DOCUMENTS

| | | |
|---|---|---|
| WO | 97/20196 A1 | 6/1997 |
| WO | 2016/145597 A1 | 9/2016 |

OTHER PUBLICATIONS

EP Search Report, dated Nov. 21, 2018 issued in corresponding EP application No. 18176655.1, filed Jun. 7, 2018, Entitled: Method and Device of Determining a Time-of-Flight of an Optical Signal Between a Starting Point of an Optical Path and a Reflection Point Within the Optical Path.

Wang, Z.N., et al., "Long-range and high-precision correlation optical time-domain reflectometry utilizing an all-fiber chaotic source", Optics Express, vol. 23, No. 12, Jun. 4, 2015.

Yang, Guangyao, et al.: "Long Range Distributed Vibration Sensing Based on Phase Extraction from Phase-Sensitive OTDR", IEEE Photonics Journal, IEEE, USA, vol. 8, No. 3, Jun. 1, 2016.

* cited by examiner

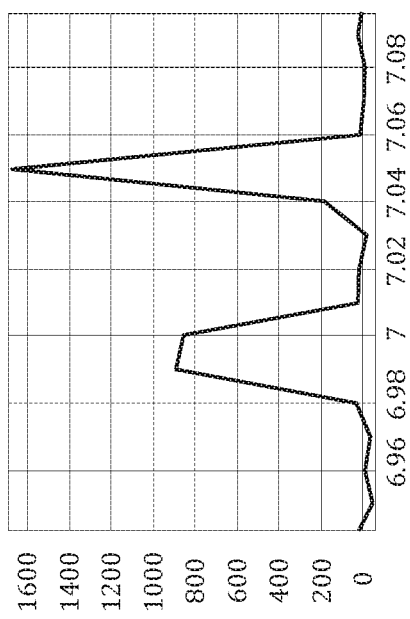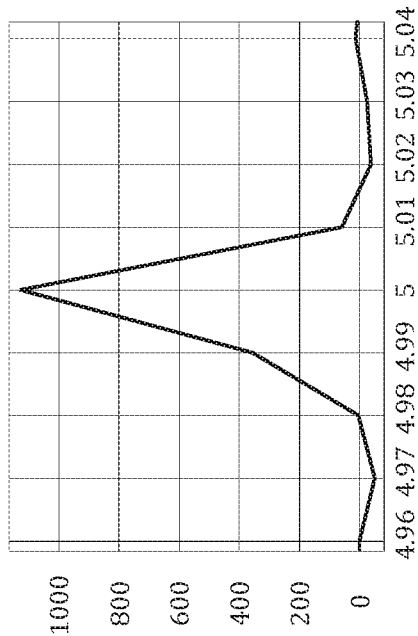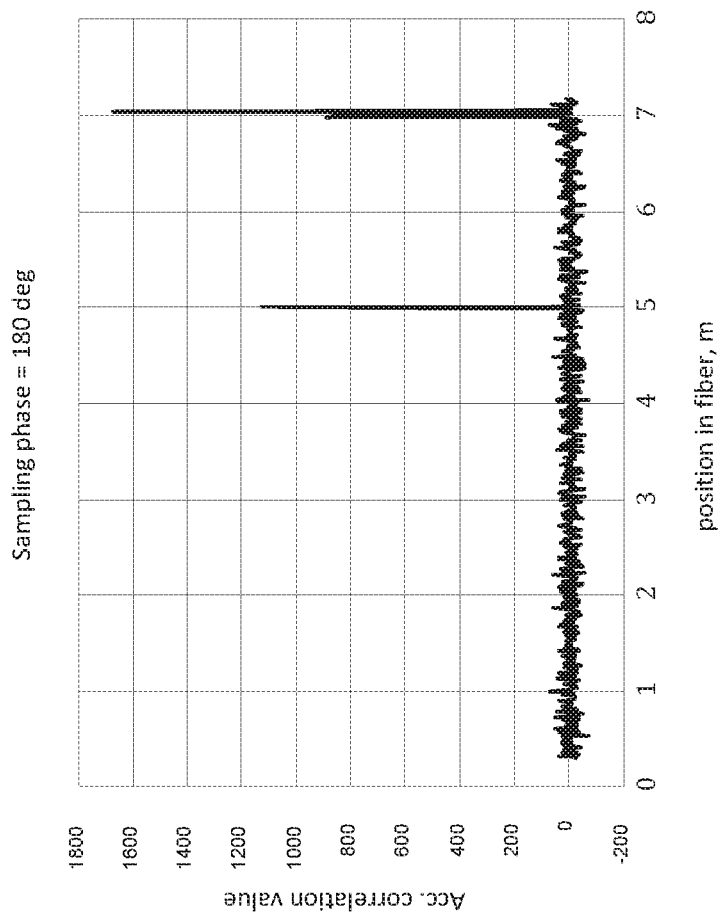

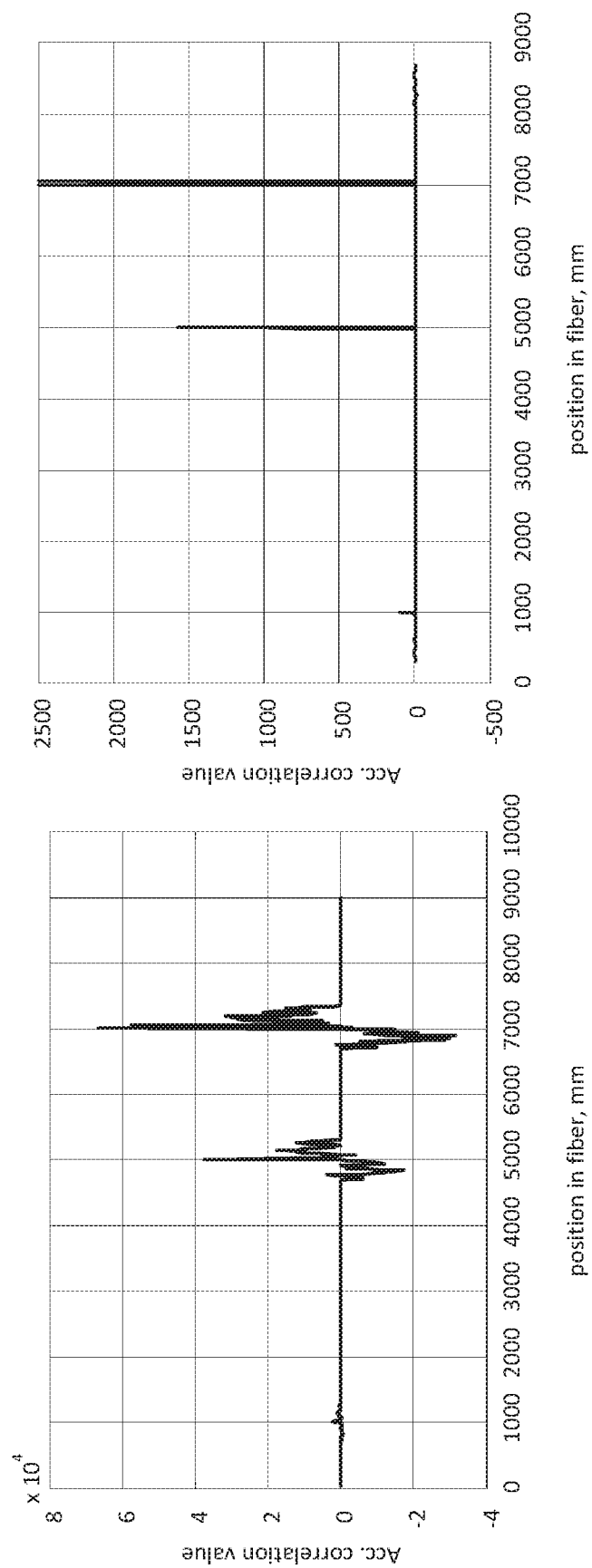

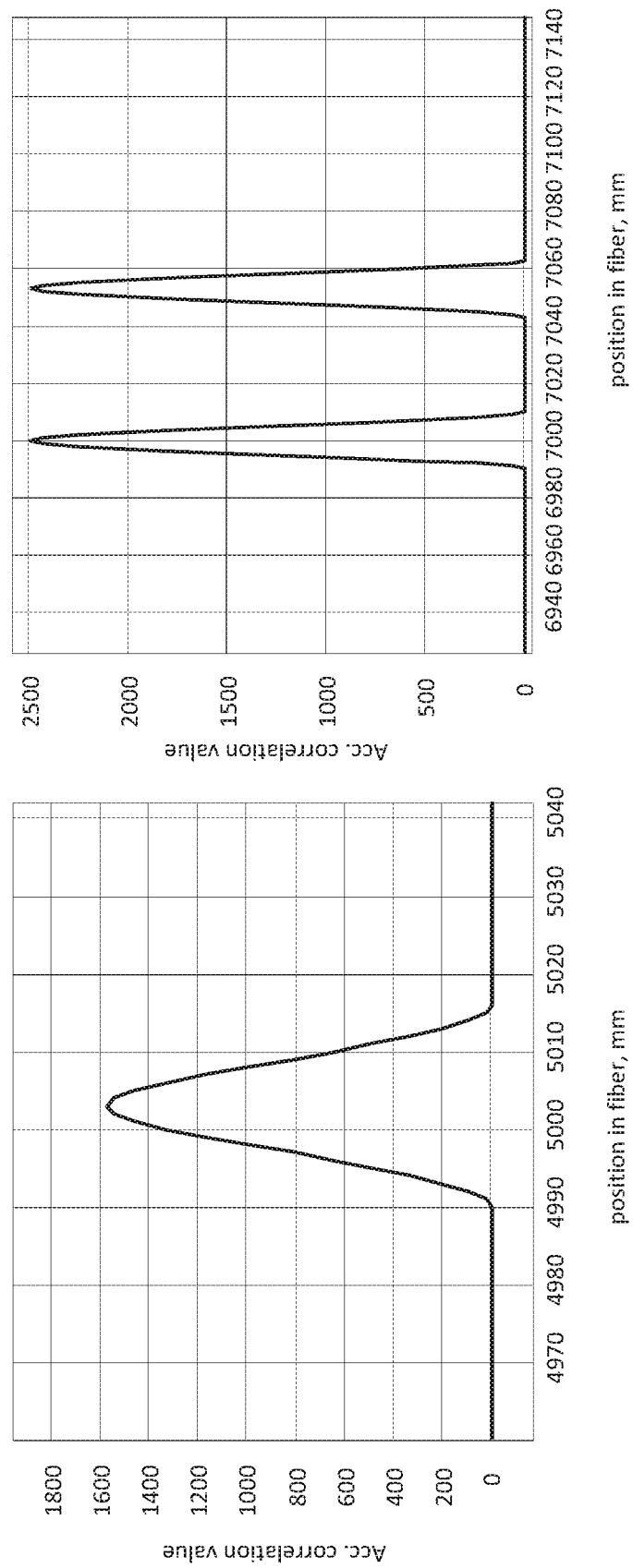

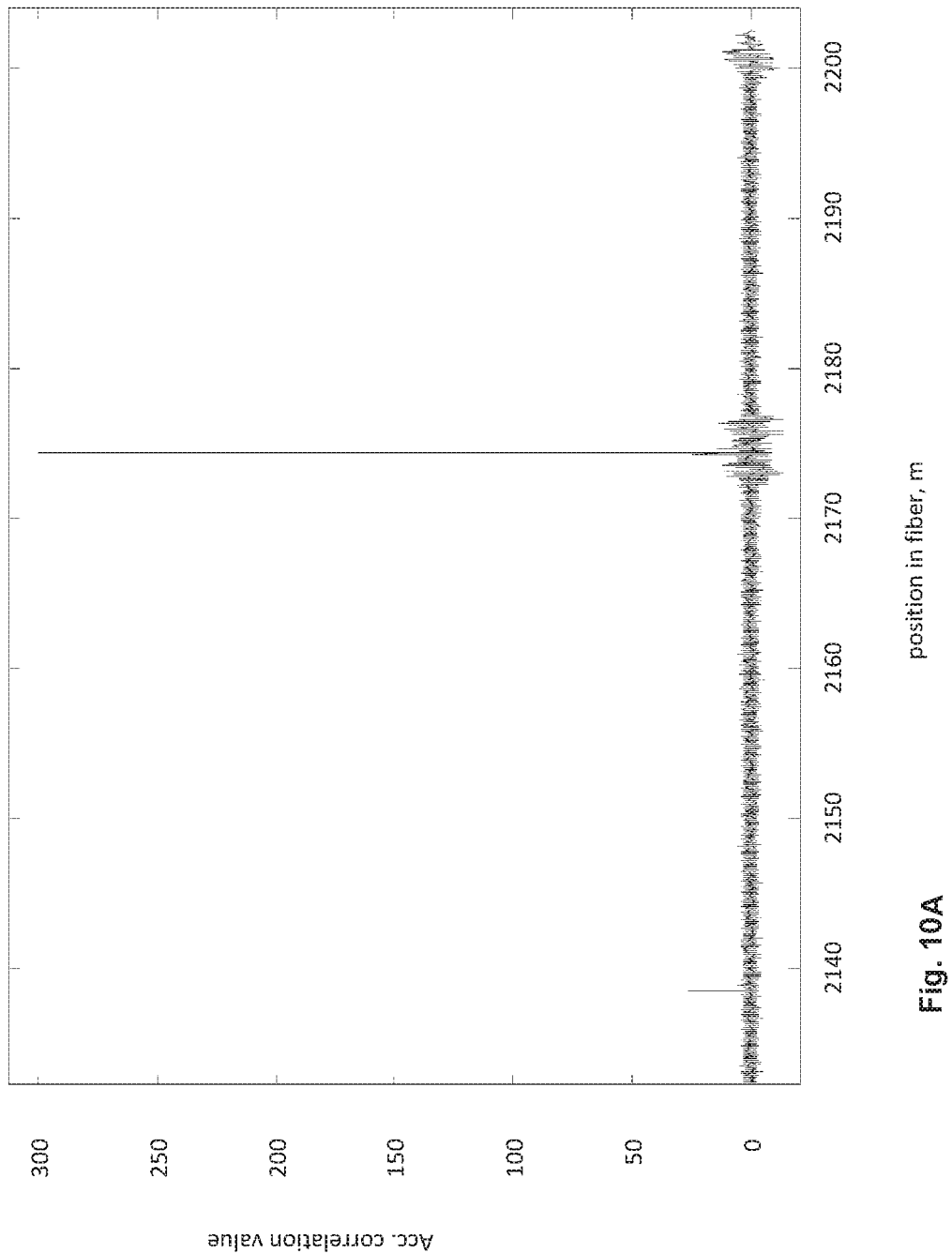

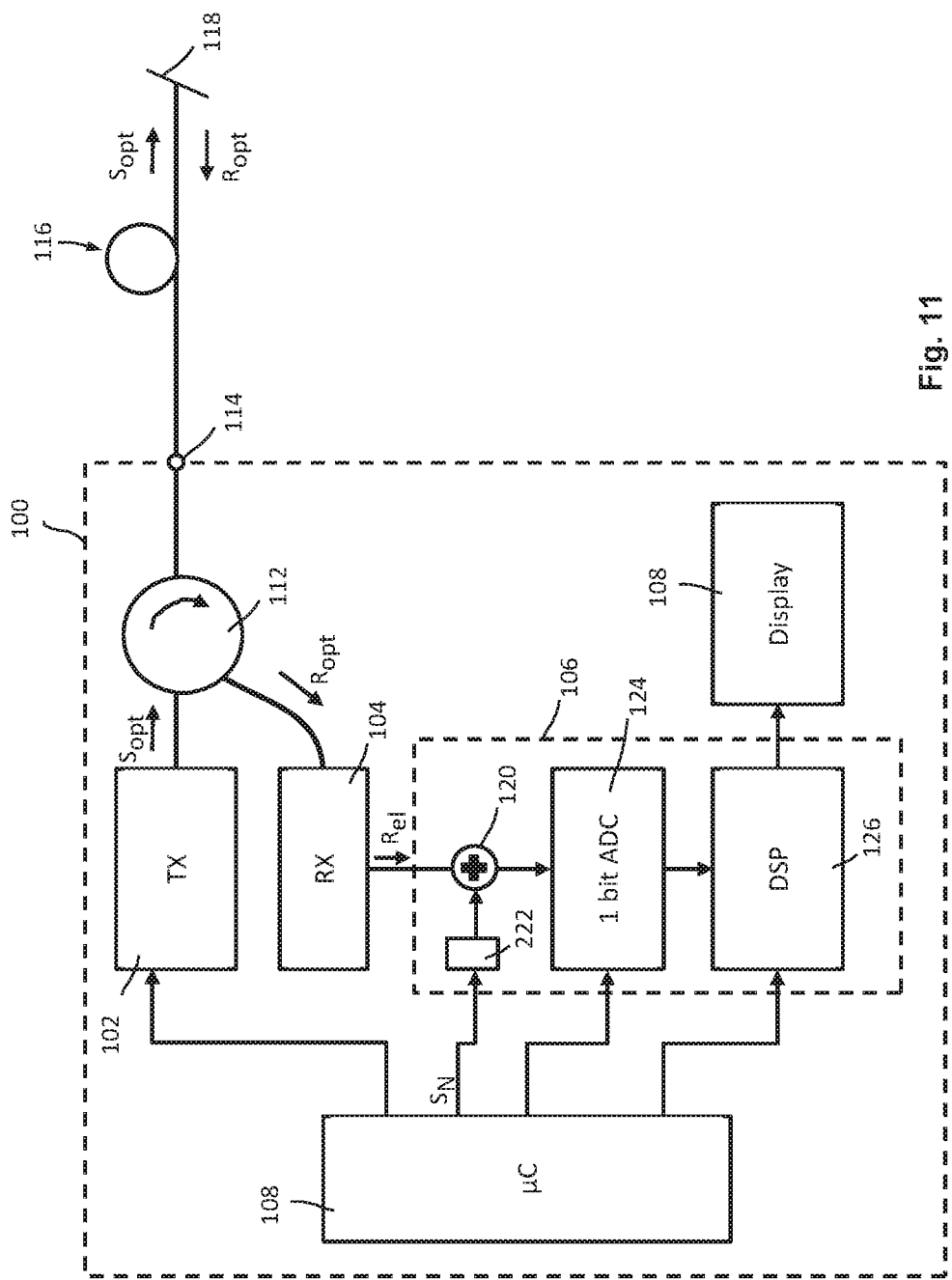

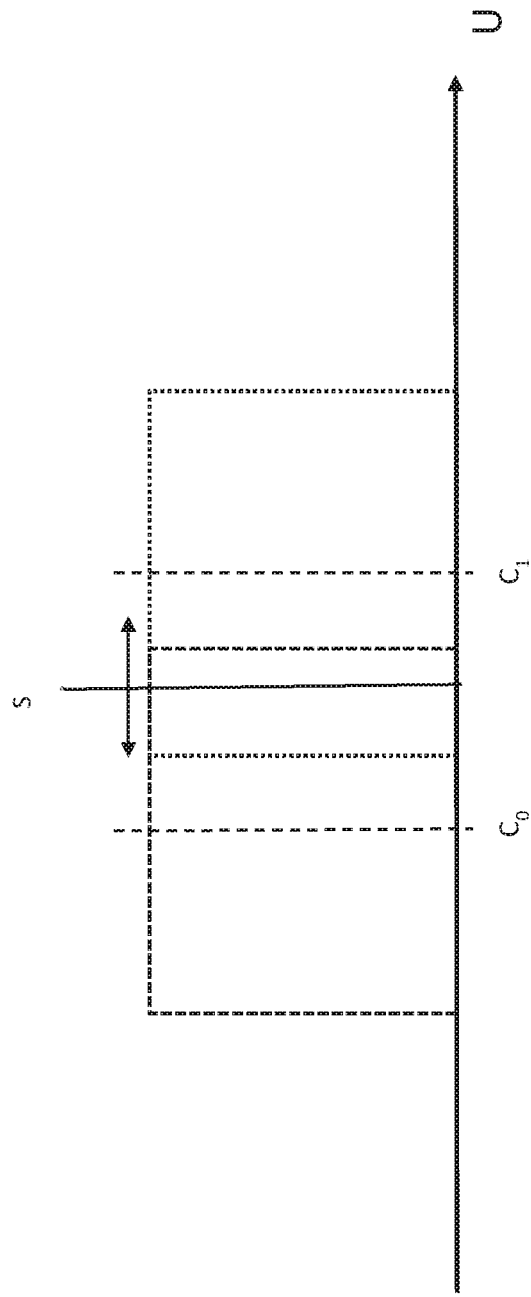

METHOD AND DEVICE OF DETERMINING A TIME-OF-FLIGHT OF AN OPTICAL SIGNAL BETWEEN A STARTING POINT OF AN OPTICAL PATH AND A REFLECTION POINT WITHIN THE OPTICAL PATH

CROSS-REFERENCE TO RELATED APPLICATIONS

This application claims priority from EP patent application no. 18176655.1, filed Jun. 7, 2018, the contents of which is herein incorporated by reference.

FIELD

The invention relates to a method of determining a time-of-flight of an optical signal between a starting point of an optical path and a reflection point within the optical path, especially an optical fiber.

BACKGROUND

Knowing the time-of-flight of an optical signal in an optical path as precisely as possible is required for a plurality of technical applications, e.g. for synchronizing clocks or the remote control of phased arrays for radio applications. Depending on the application, the knowledge of the time-of-flight or propagation time with an accuracy of better than 10 ps is required.

When both ends of the optical path are accessible at the same location, a simple propagation time measurement using optical pulses or a delay measurement with a vector network analyzer can be performed. However, often, the two ends of the optical path, e.g. the optical fiber, are at different locations and no prior time synchronization between these locations is available. It is therefore desired to perform the measurement of the time-of-flight of the optical signal using one end of the optical path only. Moreover, a low cost solution is desired in order to keep down the costs of the whole system.

For deployed optical fibers, optical time domain reflectometer (OTDR) measurements using short pulses, coherent OTDR measurements or correlation OTDR measurements using random bit sequences are applied, which allow to perform the measurements at one end of the optical path. However, the precision of a pulsed OTDR is only within the range of several tenths of nanoseconds, which corresponds to a few meters of propagation distance, due to the measurement pulse width.

In "Long-range and high-precision correlation optical time-domain reflectometry utilizing an all-fiber chaotic source", Opt Express, Jun. 15, 2015, pages 15514-15520, a correlation OTDR using a broad optical spectrum enabling a spatial resolution of 82 mm corresponding to 820 ps round-trip time (RTT) is described.

A coherent OTDR using a vector network analyzer and providing a resolution in the picosecond range has been reported in S. Rommel et al., "Analysis of Few-Mode Multi-Core Fiber Splice Behavior Using an Optical Vector Network Analyzer," ECOC 2017, paper W.3.B.5. However, here only a meter of fiber was tested. For longer fibers, the required phase stability of the laser would be prohibitive to a low-cost implementation.

A correlation OTDR using bit sequences and correlation of the reflected signal with a second sequence is used in EP 1 712 888 A1. However, the use of an analog-to-digital converter (ADC) on the receiver side prohibits a high-accuracy and high-speed operation at low cost.

EP 1 565 718 A1 discloses a correlation OTDR with a single-bit ND conversion, also referred to as "slicing", of the reflected signal. While this solution is directed towards a low-cost implementation, the resolution is limited to the inverse of the data rate of the random bit sequence. For example, the resolution is limited to 100 ps if a 10 Gb/s signal is used.

SUMMARY

It is therefore an object of the present invention to provide a method of determining a time-of-flight of an optical signal between a starting point of an optical path and a reflection point within the optical path, especially an optical fiber, that uses the principle of a correlation OTDR and that allows a high precision and high resolution measurement. Further, the method shall be implementable at low cost. It is a further object of the present invention to provide a device for determining a time-of-flight of an optical signal between a starting point of an optical path and a reflection point within the optical path, especially an optical fiber, that implements this method.

The invention achieves these objects by the combination of features according to independent claims 1 and 13. Further advantageous embodiments are defined by the dependent claims.

The invention starts from the finding that the accuracy and resolution of a correlation OTDR using sequences of pulses according to one or more transmit code sequences having noise-like statistical properties—especially the property that the autocorrelation function reveals a main peak and, as the case may be, pre- and post-peak oscillations—and a single bit ND-converter can be improved by sampling the electrical return signal at different phases and thereby deriving two or more receive code sequences from at least one electrical return signal.

According to the invention, the two or more receive code sequences can be derived from one or more electrical return signals, wherein at least two receive code sequences are generated by sampling and slicing the same one of the one or more electrical return signals at different phase positions. That is, n-fold oversampling and subsequent slicing is used in order to create at least two receive code sequences that are assigned to different sampling phases. For this purpose, the (sliced) values have to be de-interleaved in order to create the respective receive code sequences for a given phase.

In an alternative, the two or more receive code sequences can be derived from two or more electrical return signals, wherein at least two receive code sequences are generated by sampling and slicing different ones of the two or more electrical return signals at different phase positions. That is, no oversampling is applied and the sampling rate is equal to the bit rate of the sequence of pulses of the optical probing signal.

According to the invention, a multi-phase correlation function can be determined by calculating, for each receive code sequence that has been determined for a given phase position, values of a discrete correlation function by correlating the respective receive code sequence and the transmit code sequence of the corresponding optical probing signal, and interleaving the values of the at least two discrete correlation functions according to their respective phase position. In an alternative, the multi-phase correlation function can be determined by, if required, interleaving the receive code sequences that have been determined for different phase positions according to their respective phase position in order to create an interleaved receive code sequence, and creating an interleaved transmit code sequence by interleaving a number of transmit code sequences that corresponds to the number of different phase positions, and correlating the interleaved receive code sequence and the interleaved transmit code sequence.

The multi-phase correlation function can be used to identify the main peak that corresponds to the reflection point, wherein this discrete multi-phase correlation function has a higher resolution than a correlation function that is determined on the basis of a receive code sequence that is obtained by sampling and slicing at a single phase only.

Of course, in all these alternatives, more than one type of transmit code sequence may be used for creating more than one optical probing signal (first alternative with oversampling) or more than two optical probing signals (second alternative with no oversampling). Especially, complement code sequences (e.g. using Golay codes) may be used so that for each phase two complementary receive code sequences and respective (complementary) discrete correlation functions can be determined. The multi-phase correlation functions may be determined by adding the respective two complementary correlation functions that have been determined for the same phase and subsequently interleaving the added correlation functions or by determining a first and a second (complementary) multi-phase correlation function for each of the two complementary receive code sequences by interleaving the respective discrete correlation functions and then adding these two complementary multi-phase correlation functions.

In this way, it is possible to increase the resolution and accuracy of the measurement in the range below the bit duration of the sequence of pulses.

The pulse sequences used may be e.g. bursts of pseudo-random bit sequences (PRBS). Such PRBS may be created by linear-feedback shifted registers (LFSR). However, also complementary codes, e.g. Golay codes, can be used to create the transmit pulse sequences. Using complementary code sequences may be advantageous as the sum of the autocorrelation functions of two complementary code sequences has no side lobes preceding and succeeding the main peak. Thus, by using complementary code sequences, filtering of the correlation function created by correlating the transmit code sequence and the respective receive code sequence in order to cancel or at least reduce the side lobes or pre- and post-peak oscillations can be omitted.

In order to determine the time-of-flight (round trip time (RTT)) of an optical signal to and from a known reflection point of the optical path, e.g. the end of the optical path, a means for increasing the reflectivity at this point may be provided. For example, the end face of the optical path, like a mirror-like end face of an optical fiber, which provides a reflectivity of approx. 4% (if the end face is perpendicular to the optical axis of the optical path), may be coated in order to increase the reflectivity. Of course, any other type of reflector providing a lower or higher reflectivity, e.g. an optical circulator, may be provided at the far end of an optical path, wherein one port of the optical circulator is connected to the optical path and the two other ports of the optical circulator are directly connected by an optical path (preferably as short as possible).

In this way, changes of the time-of-flight due to changes of optical properties of the optical path that influence the group velocity of the light used for performing the measurement may be measured. This allows to provide a method and a device for measuring temperature changes or even the absolute temperature of the optical path using an appropriate calibration. It is further possible to change the wavelength of the light used for the measurement in order to measure the spectral properties of the optical path, especially the chromatic dispersion.

Of course, all these measurements may also be performed by using two arbitrary reflection points defined by the optical path or only one reflection point in case the optical transmitter is directly coupled to the optical path without defining a reflection point at the coupling position (i.e. the coupling is essentially lossless).

According to an embodiment of the invention, the electrical return signal comprises a Gaussian noise component having a probability density function having a standard deviation greater than or equal to four times the average signal value. If this condition is not met due to the properties of the signal transmitter and/or signal receiver, an additional noise component, especially a white Gaussian noise component, may be added to the electrical return signal created by the signal receiver. In this way, it can be achieved that the main peak of the correlation function is independent of the slicing threshold and proportional to the signal power of the receive code sequence derived from the electrical return signal. The average signal value (e.g. the average voltage of the electrical return signal) may be determined by averaging the signal over a time period in which actually a reflected portion is present within the electrical return signal if it is desired to dynamically adapt the standard deviation to the actual values of the electrical return signal. It is however also possible to use a fixed value for the standard deviation, i.e. a fixed noise component, depending on a given measurement range (e.g. defined by a maximum signal value that can be detected without driving the receiver into saturation).

Of course, instead of the above-mentioned normalization to the average signal value a normalization to the difference value of the signal values of a 1 bit and a 0 bit could be used. In this case the standard deviation of a Gaussian noise component should be greater than or equal to two times this difference value (the average value is (with sufficient accuracy) equal to half this difference value in a noise-like signal).

According to a further embodiment of the invention, a curve fitting method is used in order to create a function of time comprising or approximating selected points of the multi-phase correlation function in the region of the main peak, wherein a maximum of the function of time is determined and the time position of the maximum is interpreted as the time-of-flight. In this way, the accuracy of determining the position of the main peak within the multi-phase correlation function and thus the accuracy of determining the time-of-flight is further improved. Especially, a Gaussian curve may be fitted to the selected points of the multi-phase correlation function in the region of the main peak. Using Gaussian fitting leads to similar results as using a raised cosine fitting but is numerically better feasible.

The inventor was able to show that, using a 10 Gbit/s optical probing signal, an accuracy in determining the time-of-flight (RTT) in the range of 10 ps (corresponding to a spatial resolution of approx. 1 mm) can be achieved.

According to another embodiment of the invention, a plurality of identical optical probing signals is used to determine each of the discrete correlation functions for the different sampling phases, wherein a plurality of receive code sequences is derived by sampling and slicing respective electrical return signals at the same phase positions, wherein the bit values of corresponding bits of the receive code sequences are averaged in order to create an averaged receive code sequence and wherein the averaged receive code sequence is used to determine the discrete correlation function by correlating the averaged receive code sequence and the respective transmit code sequence of the corresponding optical probing signals.

By (arithmetically) averaging two or more receive code sequences (that have been determined for the same phase), the noise of the respective discrete correlation function can be reduced. The term "averaging" here of course comprises any scaling of the result, so that the method of simply adding the bit values of the receive code sequences is also comprised. Of course, optical probing signals comprising identical transmit code sequences must be used in order to create the averaged receive code sequence for a given phase that is used to determine the respective discrete correlation function. This, of course, also applies if two complementary transmit code sequences are used in order to create complementary correlation functions.

It would, of course, also be possible to determine two or more discrete correlation functions for each of two or more receive code sequences that have been determined for the same phase and to average the plurality of discrete correlation functions. However, this would lead to a much higher signal processing effort as calculating a correlation function is much more complex than simply adding bit values.

In another embodiment of the invention, a plurality of identical optical probing signals is used for performing a measurement, wherein a constant decision threshold is used for performing the slicing of the sampled values, wherein a constant value, e.g. a signal voltage, is added to each of the respective electrical return signals and wherein the constant values have a uniform amplitude distribution over all electrical return signals. This leads to a similar effect as using or creating an electrical return signal that comprises a sufficient (Gaussian) noise component (see above). Due to the constant slicing threshold, a density distribution of the sampled and sliced values is created with the effect that the decision probability is independent of the decision threshold, as long as the threshold is within the density distribution and the (partial) distributions for the 0 bit and the 1 bit overlap. In this embodiment, the noise component of the electrical return signal may even be zero or have a low standard deviation (i.e. a low ratio of the standard deviation and the average value of the electrical return signal). In other words, in this alternative, the constant values added to the electrical return signals, wherein the plurality of constant values have a uniform amplitude distribution, take the place of the noise component and lead to similar effects.

According to an embodiment of the invention, the uniform distribution of the constant values is obtained by using a linear function or dependency for the constant value, wherein a minimum value of this linear function or dependency is less than or equal to minus half of the absolute value of the difference of the signal value for a 1 bit and the signal value of a 0 bit of the sequence of pulses in the electrical return signal received, and a maximum value of this linear function or dependency is greater than or equal to the absolute value of this difference, and wherein the constant decision threshold lies within the distribution of the sampled values.

Due to this rule for determining the constant values that are added to the plurality of electrical return signals, it can be assured that the partial density distributions of the sampled values overlap.

The minimum and the maximum values of the linear function or dependency can be determined by choosing predetermined fixed values depending on approximate expected values for 0 and 1 bits included in the electrical return signal. Of course, if a 0 bit corresponds to a signal value of approximately zero, the fixed minimum and maximum values can be determined by taking into account or measuring the signal value of a 1 bit of the electrical return signal, only.

It shall be mentioned at this point that the feature of adding constant values to a plurality of electrical return signals (corresponding to a plurality of optical probing and optical return signals) may be used independently of the principle of applying a multi-phase sampling in order to increase the accuracy and resolution of a correlation OTDR. By using a plurality of optical probing signals and adding discrete values to the respective electrical return signals before performing the sampling and slicing, the characteristic of the noise components comprised by the electrical return signals does not have to be analyzed or taken into account. No adding of an additional noise component is necessary. This simplifies the design of a correlation OTDR of this kind. Thus, the method of claims 6, 7 and 8 may be applied without the features of claim 1 or any other dependent claim that refers to the multi-phase sampling and slicing principle. The same applies to independent device claim 13.

According to another embodiment of the invention, a plurality of identical optical probing signals is used and a variable decision threshold is used for performing the slicing of the sampled values, wherein the decision threshold is kept constant for slicing the sampled values of each of the electrical return signals, wherein the decision threshold is varied between a minimum value, e.g. a value corresponding to or close to the signal value of a 0 bit, and a maximum value, e.g. a value corresponding to or close to the signal value of a 1 bit, and wherein values of the variable decision threshold have a uniform distribution over all electrical return signals.

This embodiment is similar to the embodiment that uses a constant decision threshold but, with respect to the plurality of identical optical probing signals, variable signal values that are added to the electrical return signal. In both cases, the slicing or decision threshold and the electrical return signal are shifted relative to each other.

Also these features that refer to the use of a variable slicing threshold may be used independently of the principle of applying a multi-phase sampling in order to increase the accuracy and resolution of a correlation OTDR.

According to an embodiment of the invention, the multi-phase correlation function is filtered in such a way that pre-peak and post-peak oscillations within the multi-phase correlation function are cancelled or at least reduced, e.g. by using a FIR filter. The filter characteristic may be equal or approximately equal to the inverse of the PRBS-response.

Further, a deconvolution of at least a selected part of the correlation function comprising the main peak may be carried out in order to separate potentially overlapping peaks that form the main peak, wherein, preferably, the deconvolution is carried out only in case the main peak is broader than expected taking into account the bit duration of the sequence of pulses of the optical probing signal, e.g. if the full width at half maximum of the main peak is greater than the bit duration of the sequence of pulses of the optical probing signal. In case two or more separate maxima or peaks can be identified within the range of the main maximum, an analytical curve, e.g. a Gaussian curve may be fitted to selected points of each of the peaks.

In another embodiment of the invention, the sampling and slicing of the electrical return signals may be restricted to a predetermined sampling time interval of interest. The time delay between the start time of the sampling time interval and the start time of the sequence of pulses of the respective optical probing signal may then be taken into account when determining the time-of-flight, preferably by adding this time difference to the time position of the main peak. This gating of the receiver helps to avoid having to process tens of millions of bits in parallel, i.e. to reduce the amount of data to be processed.

A device according to the present invention comprises a signal transmitter, a signal receiver and a signal processing device, wherein the signal processing device is adapted to carry out the steps of the methods described above.

If noise must be added to the electrical return signal, a noise generator may be provided which is adapted to generate Gaussian white noise signal, wherein the Gaussian white noise signal is added to the electrical return signal by a signal adder.

Of course, in the embodiments which use the method of adding a constant value to the electrical return signal that is varied over a plurality of electrical return signals used for a measurement, a device for generating the constant value and a device for adding the constant value to the electrical return signal are provided. As in the case of adding a white Gaussian noise, the adder may e.g. be realized as a summing amplifier.

In the embodiment that uses the method of varying the decision threshold, a device for generating or defining the threshold (value) and controlling the threshold (value) must be provided. These means may be integrated within the slicer (1-bit ADC).

BRIEF DESCRIPTION OF THE DRAWINGS

These and other features and objects of the present invention will become more fully apparent from the following description of specific embodiments thereof which are illustrated in the drawings. It is appreciated that these drawings depict only typical embodiments of the invention and are therefore not to be considered limiting of its scope. The invention will be described and explained with additional specificity and detail through the use of the accompanying drawings in which:

FIGS. 4B and 4C show the enlarged ranges around the reflection peaks at approx. 5 m and 7 m, respectively;

FIG. 5A, FIG. 5B and FIG. 5B show diagrams illustrating a similar simulation result as FIG. 4A, FIG. 4B and FIG. 4C, wherein the sampling phase (relative to the reflected bit clock) $\varphi=180°$;

FIG. 7 shows a diagram illustrating a similar simulation result as FIG. 6A, FIG. 6B and FIG. 6C, wherein multi-phase sampling and slicing and averaging of the bits of a plurality (e.g. 999) of detected receive code sequences has been applied and wherein the respective resulting multi-phase correlation function has not yet been filtered;

FIG. 8A, FIG. 8B and FIG. 8C show diagrams illustrating the filtered multi-phase correlation function, wherein FIG. 8A shows a curve for the whole fiber length of approx. 7 m and FIGS. 8b and 8c show the enlarged ranges around the reflection peaks at approx. 5 m and 7 m, respectively;

FIG. 10A, FIG. 10B and FIG. 10C show diagrams illustrating a measurement result obtained by applying a correlation OTDR method using a 10 Gb/s 127 bit PRBS sequence in order to examine an approx. 2200 m single-mode optical fiber (FIG. 10A), wherein the electrical return signal is sampled and sliced at a sampling rate that equals 4-times the bit rate of the PRBS sequence and wherein the correlation result has been filtered in order to reduce or suppress pre- and post-peak oscillations; FIGS. 10B and 10C show the enlarged ranges around the reflection peaks at approx. 2138.5 m and 2174.4 m, respectively;

FIG. 11 shows a general schematic diagram of the main components of a correlation OTDR similar to FIG. 1A, wherein, instead of a Gaussian white noise signal, a deterministic signal is added to the electrical return signal; and FIG. 12 shows a diagram illustrating probability density distributions of signal values (voltage U) for 0 bits and 1 bits of a plurality of electrical return signals comprising sequences (bursts) of pulses according to respective optical return signals returning from an optical path in response to corresponding optical probing signals, wherein a different constant signal value (obtained from a slope) has been added to each electrical return signal and wherein the 0 bits and 1 bits of the electrical return signals have discrete signal values (center levels) $C_0$ and $C_1$, respectively.

DETAILED DESCRIPTION

Figure 1:
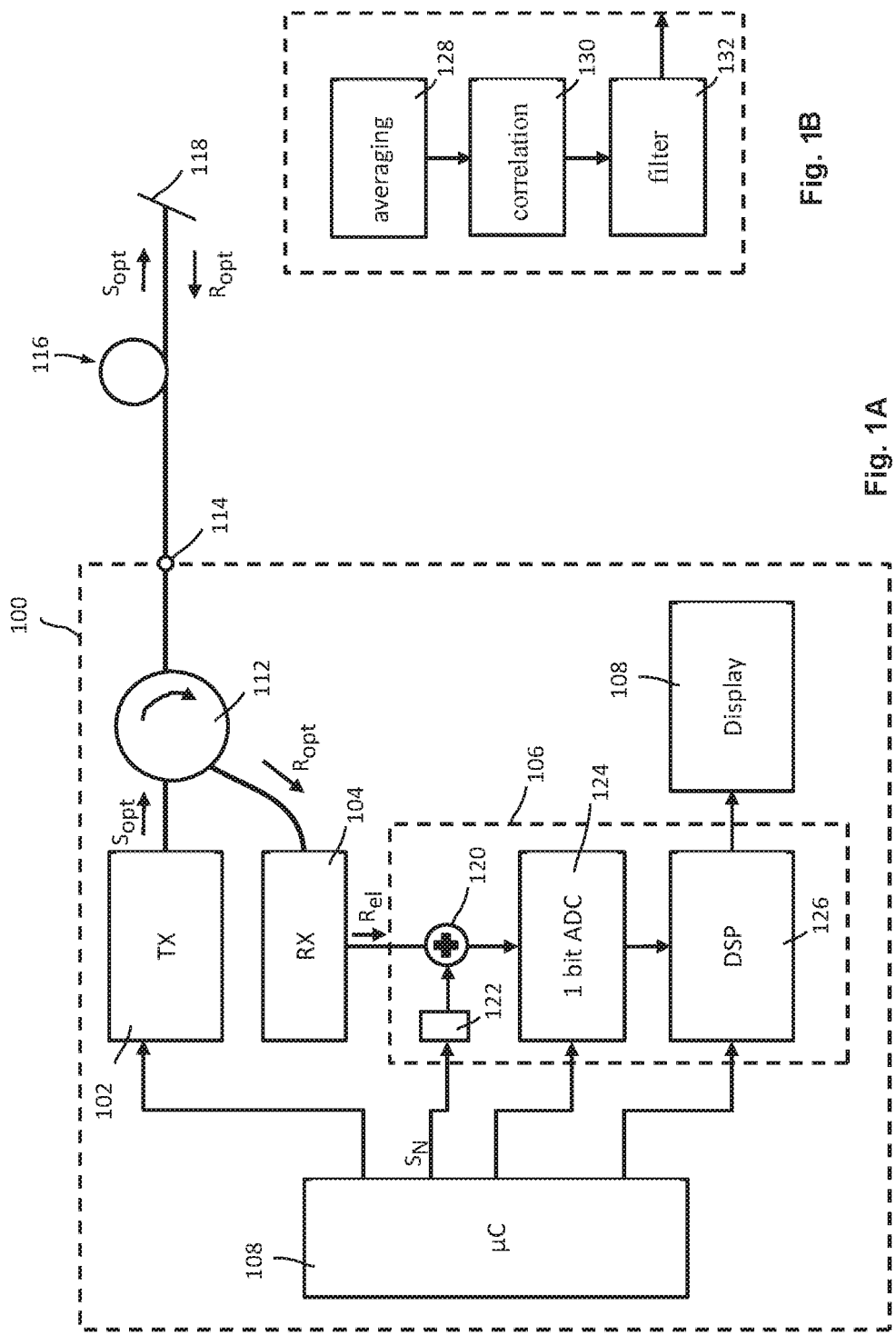
FIG. 1A and FIG. 1B show a general schematic diagram of the main components of a correlation OTDR (FIG. 1A) and a more detailed schematic diagram of the digital signal processor (FIG. 1B) that implement the method according to the invention.

FIGS. 1A, 1B show a schematic diagram illustrating the main components of a correlation OTDR 100 according to the present invention. The correlation OTDR 100 comprises a signal transmitter 102, a signal detector 104, a signal processing device 106 and a control device 108. Further, the correlation OTDR 100 comprises a display 110, which is adapted to display measurement results.

The signal transmitter 102 is adapted to create optical probing signals $S_{opt}$, wherein each probing signal $S_{opt}$ comprises a sequence of pulses according to a binary transmit code sequence. The signal transmitter 102 may comprise a laser having a fixed optical frequency or a tunable laser, so that the time-of-flight measurement can be performed for one or more selected optical wavelengths or one or more wavelength ranges. The sequence of pulses have a predetermined bit duration, phase and bit rate, wherein the bit rate typically lies within a range of 1 Gb/s and higher, especially within the range of 10 Gb/s and 40 Gb/s. Of course, the bit duration of the burst or sequence of pulses limits the spatial resolution of the correlation OTDR 100 and the number of pulses, i.e. the length of the code sequence, influences the signal-to-noise ratio (SNR). The signal-to-noise ratio can be improved by increasing the number of pulses comprised by the sequence of pulses, i.e. by increasing the number of bits of the transmit code sequence.

The transmit code sequence may be a pseudo-random bit sequence (PRBS) of a given length, for example a 127 bit PRBS. However, as explained above, also other code sequences may serve to create an optical probing signal, e.g. complementary code sequences like Golay code sequences.

The transmit code sequence that is used by the signal transmitter 102 to create the optical probing signals can be stored in a storage or storage area (not shown) of the signal transmitter 102 or in a corresponding storage or storage area within the control device 108.

As apparent from FIG. 1A, an output port of the signal transmitter 102 is connected to a first port of an optical path separator, e.g. an optical circulator 112. Of course, the optical path separator may be realized by any optical means that is capable of passing through a major portion of the optical probing signal $S_{opt}$ to the connection port 114 and of redirecting an optical signal that is received at the second port to the third port, which is connected to an input port of the signal detector 104. A second port of the optical path separator 112 is connected to a connection port 114 of the correlation OTDR 100. The connection port 114 is adapted to be connected to an optical path 116 that is to be examined (optical path under test). In the embodiment according to FIG. 1A, 1B, the optical path under test is an optical fiber. As apparent from FIG. 1A, the optical fiber 116 may be provided, at a far end thereof, with a mirror 118. The mirror 118 at least partially reflects the optical probing signal $S_{opt}$. The reflected signal is designated as optical return signal $R_{opt}$. The optical return signal $R_{opt}$ travels back to the connection port 114 and to the second port of the optical circulator 112. The optical circulator 112 redirects the optical return signal $R_{opt}$ to its third port so that the optical return signal $R_{opt}$ can be detected by the signal detector 104.

The signal detector 104 may comprise a photodiode serving to convert the optical return signal $R_{opt}$ into an electrical signal and an amplifier in order to amplify the converted electrical signal. The amplifier may be controllable with respect to its gain factor in order to create an electrical return signal $R_{el}$ having a desired SNR. The electrical return signal $R_{el}$ is output at an output port of the signal detector 104 and supplied to an input port of the signal processing device 106, which comprises an adder 120, a noise generator 122, a slicer (i.e. a 1 bit ADC) 124 and a digital signal processor (DSP) 126. The input port of the signal processing device 106 is connected to a first input port of the adder 120, e.g. an adding amplifier. The adder 120 receives, at a second input port, a noise signal $S_N$, preferably a Gaussian white noise signal that is created by the noise generator 122. Both signal components, i.e. the noise signal $S_N$ and the electrical return signal $R_{el}$, are added and the sum signal is supplied to an input port of the slicer 124. The slicer 124 may be controlled, with respect to its slicing or decision threshold S, by the control device 108. Further, the slicer 124 may be controlled, with respect to the sampling phase φ, by the controller device 108.

The slicer 124 may comprise several slicing units (not shown), wherein each slicing unit receives the electrical return signal $R_{el}$ and wherein each slicing unit is adapted to sample and slice the electrical return signal $R_{el}$ received. Preferably, each of the slicing units may be configured to sample the electrical return signal $R_{el}$ at a different phase. In this way, the slicer 124 may provide a discrete signal that comprises values of 0 and 1, only, to the DSP 126.

The slicer 124 outputs, for each probing signal, a receive code sequence that can be stored or even directly (in real time) processed by the DSP 126. If the slicer comprises only a single slicing unit, receive code sequences for different phase positions may be obtained by controlling the sampling phase of the slicing unit (by means of the control device 108) as desired. Especially, the phase position may be changed for every probing signal $S_{opt}$ or corresponding electrical return signal $R_{el}$ if no averaging is required. If averaging of receive code sequences (or discrete correlation functions) for (one, more or all) given sampling phase positions is desired, the control device 108 may control the slicer 124 in such a way that the phase position is changed in an appropriate manner, e.g. for every n-th probing signal $S_{opt}$ (i.e. every n-th electrical return signal $S_{el}$).

The DSP 126 may be controlled by the controller device 108, too, e.g. with respect to its functionality and/or start times of desired processes.

As apparent from FIG. 1B, the DSP 126 may comprise an averaging unit 128, a correlator device 130 and a filter 132.

Of course, the slicer 124 and the DSP 126 may be realized as a combination of hard- and software. Certain functions, like the sampling and slicing, must be performed in real time whereas other functions, like averaging two or more sliced (bit) values of corresponding electrical return signals, i.e. averaging the corresponding bits of two or more receive code sequences, or correlating code sequences, can be performed offline. Also filtering or de-convoluting the discrete correlation functions may be performed offline.

The DSP 126 performs all desired digital signal processing steps and creates information concerning the total time-of-flight, i.e. the time-of-flight of the optical probing signal $S_{opt}$ between its creation and a selected reflection point, e.g. the far end of the optical fiber 116, and the time-of-flight of the optical return signal between the respective reflection point and the signal detector. Of course, as the group velocity of the optical probing signal $S_{opt}$ and the group velocity of the optical return signal $R_{opt}$ are identical, the time-of-flight between the creation of the optical probing signal $S_{opt}$ and the selected reflection point may be calculated as half of the total time-of-flight. As the structure of the optical correlation OTDR between creating of the optical probing signal $S_{opt}$ and the connection port 114 and between the connection port 14 and detecting the electrical return signal $R_{el}$ is known, i.e. especially the group velocity of the optical signals within the optical paths between the signal transmitter 102 and the connection port and between the connection port and the signal detector 104 are known, it is possible to subtract from the measured total time-of-flight the propagating times within the correlation OTDR 100 in order to calculate the total time-of-flight between the connection port 114 and the selected reflection point within the optical path under test 116.

The measurement results that have been determined by the DSP 126 can be displayed on the display 110 and/or stored within the DSP 126 and/or delivered to another unit (not shown), e.g. for storing/archiving the results.

In the following, the functionality of a correlation OTDR 100 according to FIG. 1A, 1B will be described in various alternatives.

Figure 2:
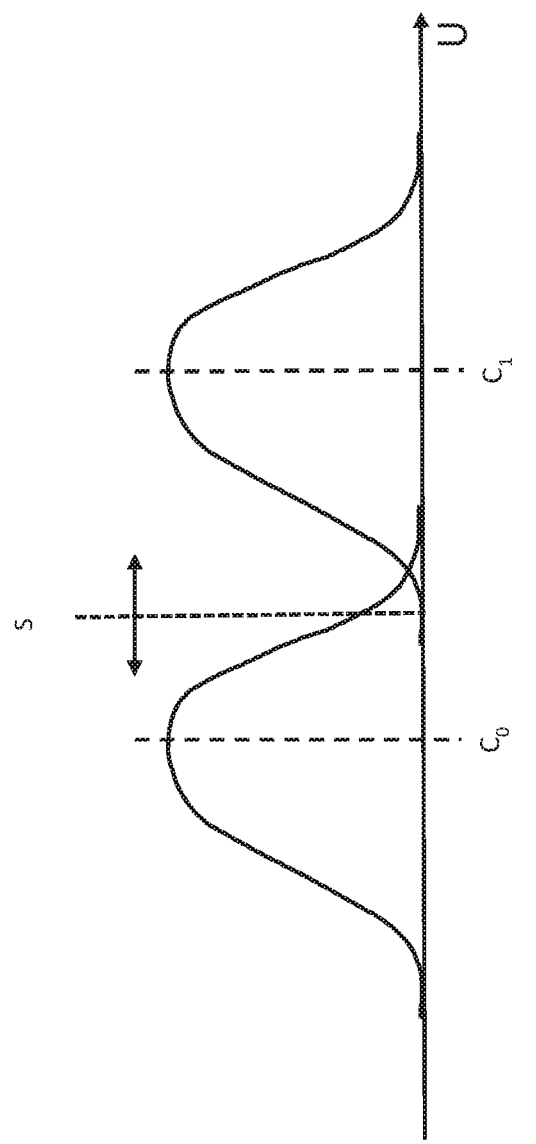
FIG. 2 shows a diagram illustrating probability density distributions of signal values (voltage U) for 0 bits and 1 bits of a plurality of electrical return signals comprising sequences (bursts) of pulses according to respective optical return signals returning from an optical path in response to corresponding optical probing signals, wherein additive white Gaussian noise is superimposed to discrete signal values (center levels) $C_0$ and $C_1$ of 0 and 1 bits, respectively.
Figure 3:
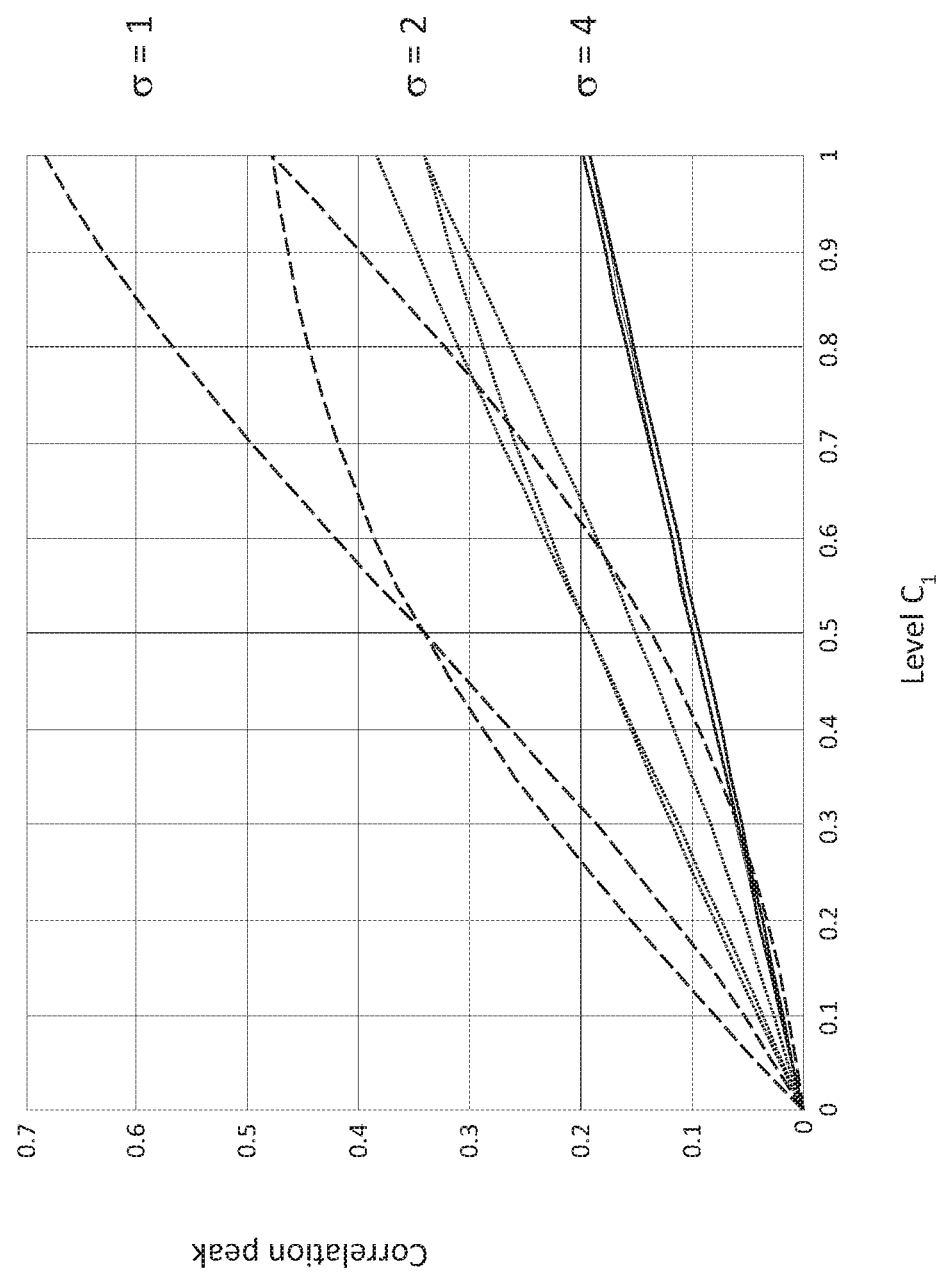
FIG. 3 shows a diagram illustrating curves, for normalized standard deviation values $\sigma=1$, $\sigma=2$ and $\sigma=4$, of the (normalized) correlation peak depending on the center level (center signal value) $C_1$ of a 1 bit under the condition that the center level $C_0$ of a 0 bit is zero.

At first, in order to better understand the principle of an OTDR measurement using the method of the present invention, the influence of noise of the measurement results is discussed with respect to FIGS. 2 and 3.

The diagram according to FIG. 2 shows density functions $P_{C0}(U)$ and $P_{C1}(U)$ for a binary signal having signal values $C_0$ and $C_1$ that is superimposed by a Gaussian white noise signal, wherein U designates the signal value, e.g. a signal voltage. The density functions P(U) of the Gaussian white noise that is superimposed on the signal values $C_0$ and $C_1$ can be written as $$P(U) = \frac{1}{\sqrt{2\pi\sigma^2}} e^{-\frac{(U-C_i)^2}{2\sigma^2}} \qquad \text{(equation 1)}$$

wherein $\sigma$ designates the standard deviation and $i \in [0, 1]$. If slicing with a threshold of $U=S$ is applied on a sampled value lower than the threshold S, a 0 bit is output by the slicer 124, and a 1 bit is output if the sampled value is equal to or greater than S. Thus, the probability that a 1 bit is output under the condition that a 1 bit has actually been generated by the signal transmitter 102 is $$p(\text{one}|\text{one}) = 0.5 * \text{erfc}\left(\frac{S-C_1}{\sqrt{2}\,\sigma}\right) \qquad \text{(equation 2)}$$

and the probability that a 1 bit is output under the condition that a 0 bit has actually been generated by the signal transmitter 102 is $$p(\text{one}|\text{zero}) = 0.5 * \text{erfc}\left(\frac{S-C_0}{\sqrt{2}\,\sigma}\right) \qquad \text{(equation 3)}$$

It can be shown that the (normalized) value of a (reflection) peak $CC_{peak}$ comprised within a discrete correlation function that is calculated by correlating a transmit code sequence and a (non-averaged) receive code sequence follows the equation $$CC_{peak} = \frac{1}{2}[p(\text{one}|\text{one}) - p(\text{zero}|\text{one}) + p(\text{zero}|\text{zero}) - p(\text{one}|\text{zero})]$$

Rewriting this equation using equations 2 and 3 and further using the relations $p(\text{zero}|\text{one})=1-p(\text{one}|\text{one})$ and $p(\text{zero}|\text{zero})=1-p(\text{one}|\text{zero})$ leads to equation 4:

$$CC_{peak} = [p(\text{one}|\text{one}) - p(\text{one}|\text{zero})] \qquad \text{(equation 4)}$$

If a single reflection point and a single probing signal and a respective single electrical return signal or corresponding receive code sequence are assumed, equation 4 can be written by using equations 2 and 3 as:

$$CC_{peak} = \frac{1}{2}\left[\text{erfc}\left(\frac{S-C_1}{\sqrt{2}\,\sigma}\right) - \text{erfc}\left(\frac{S-C_0}{\sqrt{2}\,\sigma}\right)\right] \qquad \text{(equation 5)}$$

The diagram according to FIG. 3 illustrates this equation, wherein it has been assumed that the signal value of a zero bit is zero, i.e. $C_0=0$. This Figure shows the dependency of the (normalized) value $CC_{peak}$ of a correlation peak on the (normalized) signal value $C_1$ of a 1 bit (wherein $C_1$ is the center of the respective distribution). The dashed curves have been calculated for normalized standard deviations $\sigma=1$, the dotted curves for normalized standard deviations $\sigma=2$ and the solid curves for normalized standard deviations $\sigma=4$ (the standard deviation $\sigma$ has been normalized to the average value of the electrical return signal (average over a time period in which actually a reflected portion is present). In each case, the (normalized) slicing threshold has been varied from 0 to 0.5 and 1. The diagram in FIG. 3 clearly shows that increasing the normalized standard deviation to values $\sigma \geq 4$ leads to the effect that the correlation peak value can be regarded as approximately independent of the slicing threshold S and that the correlation peak value $CC_{peak}$ approximately linearly increases with an increase in the signal value $C_1$ of a 1 bit. This last result is a prerequisite for correct detection of multiple scattering reflection events. However, the correlation peak value becomes rather low.

If averaging is applied, equation 5 is also true. Averaging the sliced bit values over multiple measurements (i.e. measurements of a plurality of an identical repeated signal) yields a value proportional to the probability of a "one" decision. That is, averaging is similar to increasing the ADC resolution of the slicer 124 (which is a 1-bit ADC), however the value depends on the noise standard deviation a and the slicing threshold S.

It is generally preferable to rescale the bit values (or averaged bit values) from a scale [0;1] into a scale [−1;1], i.e. into a bias-free scale. In order to perform the correlation, the known transmit code sequence is also rescaled into the bias-free [−1;1] scale. Thus, the values of the discrete correlation function may also be positive and negative.

When executing a measurement, the control device 108 controls the signal transmitter 102 to create and output an optical probing signal $S_{opt}$ which is supplied to the connection port 114 and thus to the optical path under test 116. The reflected portion, i.e. the optical return signal $R_{opt}$, is received by the signal receiver 104 and converted into an electrical signal. As mentioned above, the signal receiver may comprise an amplifier which can be controlled (control may also be effected by the control device 108) with respect to its gain in order to create an electrical return signal $R_{el}$ having a desired SNR.

If required, the control device 108 controls the noise generator 122 to create a noise signal which is added to the electrical return signal $R_{el}$. For simplicity, this combined signal is also referred to as "electrical return signal" in the following description. Taking into account the above explanations, the noise signal that is added to the electrical return signal $R_{el}$ output by the signal receiver is of such nature that the combined signal comprises a noise component having a normalized standard deviation a equal to or greater than four.

Simultaneously with the start of the measurement by creating a (first) optical probing signal $S_{opt}$, the control device 108 may control the slicer to start sampling and slicing the electrical return signal using a predetermined sampling rate and sampling phase (e.g. with respect to the probing signal, or the pulse sequence included therein).

In case the slicer 124 comprises a single slicing unit, the electrical return signal is sampled and sliced using the given phase and the sliced values (i.e. bits), which form a receive code sequence, are stored in the DSP 126 (or even directly further processed).

If no averaging is desired, this receive code sequence and the transmit code sequence may be correlated by the DSP 126 (i.e. the correlator 130 comprised therein, which may of course be realized as hard- or software).

In a next step, the control device 108 controls the signal transmitter to create a further optical probing signal. The time difference between creating probing signals is chosen to be greater than the expected time-of-flight (RTT) for the optical path 116 under test. The control device 108 further controls the slicer 124 to sample the respective electrical return signal $R_{el}$ at a different phase. Again, the sliced values (i.e. the values of a receive code sequence of a different phase position) are stored and further processed in the DSP 126. In this way, receive code sequences may be obtained for all phase positions desired. Of course, the first phase position may be chosen arbitrarily and all further phase positions may be chosen (e.g. in an equidistant manner) relative to this first phase position, i.e. a phase position $\varphi=0°$ is defined by the first (arbitrary) phase position and the maximum phase position of $\varphi=360°$ corresponds to a shift of a single bit interval.

In this alternative, a plurality of (i.e. two or more) probing signals $S_{opt}$ is required in order to obtain receive code sequences for a plurality (i.e. two or more) of phase positions.

In another alternative, the receive code sequences for different phase positions may be obtained by oversampling the electrical return signal $R_{el}$. For this purpose, the slicer 124 may comprise a corresponding plurality of slicing units, wherein each slicing unit is adapted to sample and slice the electrical return signal at a different phase position. The respective receive code sequences, which are obtained from the same electrical return signal $R_{el}$, may then be processed as described above (and below). It would even be possible to use two or more slicing units and to change the phase position of each unit in order to increase the oversampling. This alternative makes use of oversampling (i.e. obtaining two or more receive code sequences from the same electrical return signal) and obtaining further receive code sequences for further phase positions from further electrical return signals $R_{el}$.

It would also be possible to use a slicer 124 that is capable of oversampling and slicing an electrical return signal $R_{el}$, i.e. already "interleaved" receive code sequences for different phases may be obtained from the same electrical return signal. For further processing, these interleaved receive code sequences may be de-interleaved so as to obtain receive code sequences having the same bit rate as the transmit code sequence.

The DSP 126 correlates each receive code sequence for a given phase and the transmit code sequence in order to create a discrete correlation function. Of course, the correlation function has a peak at each point in time that corresponds to a fiber position causing a sufficiently high reflection. The correlation functions for the different phase positions can be interleaved so as to form a multi-phase correlation function. As this discrete multi-phase correlation function has a higher resolution, it is possible to determine the position of a reflection peak with a higher accuracy than in case of a "single-phase correlation function".

In another alternative, instead of de-interleaving the oversampled receive code sequences for further processing, a corresponding "oversampled" transmit code sequence may be created by n-fold interleaving the transmit code sequence (wherein n is an integer number equal to the number of different phase positions). Correlating such an "oversampled" transmit code sequence with the oversampled receive code sequence also results in the desired multi-phase correlation function.

As already mentioned above, averaging may be used in order to increase the measurement accuracy and resolution. For this purpose, two or more receive code sequences for each phase position may be obtained, e.g. by changing the sampling phase for slicing every n-th electrical return signal $R_{el}$. Averaging may then be effected by either calculating the discrete correlation functions for each receive code sequence of a given phase and then averaging the discrete correlation functions by averaging the respective discrete values corresponding to a given sampling time (even summing the discrete values of the correlation function may be applied) or by first averaging all receive code sequences by averaging the discrete values thereof and then calculating a discrete (averaged) correlation function by correlating the averaged receive code sequence and the transmit code sequence. However, the latter alternative requires by far less effort in order to calculate the discrete correlation function.

Figure 4B:
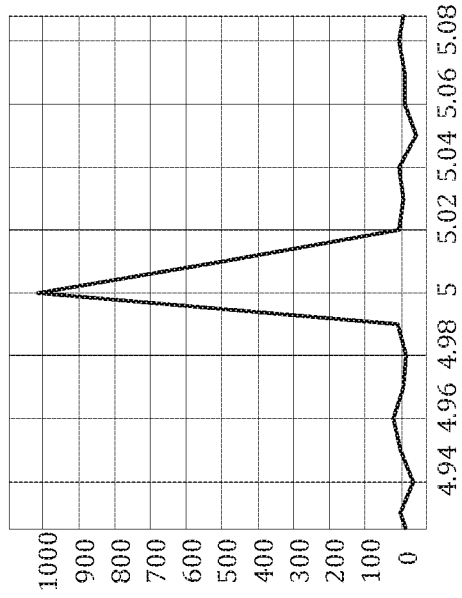
FIG. 4A, FIG. 4B and FIG. 4C illustrate a simulation result obtained by applying a correlation OTDR method using a 10 Gb/s 127 bit PRBS sequence in order to examine an approx. 7 m single-mode optical fiber (FIG. 4A), wherein the electrical return signal is sampled and sliced at a sampling rate that equals the bit rate of the PRBS sequence and wherein the sampling phase (relative to the reflected bit clock) $\varphi=0°$ and wherein the correlation result has been filtered in order to reduce or suppress pre- and post-peak oscillations.
Figure 4C:
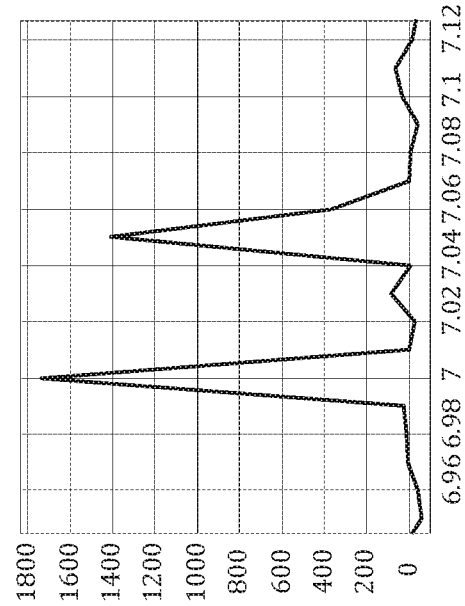
Figure 4A:
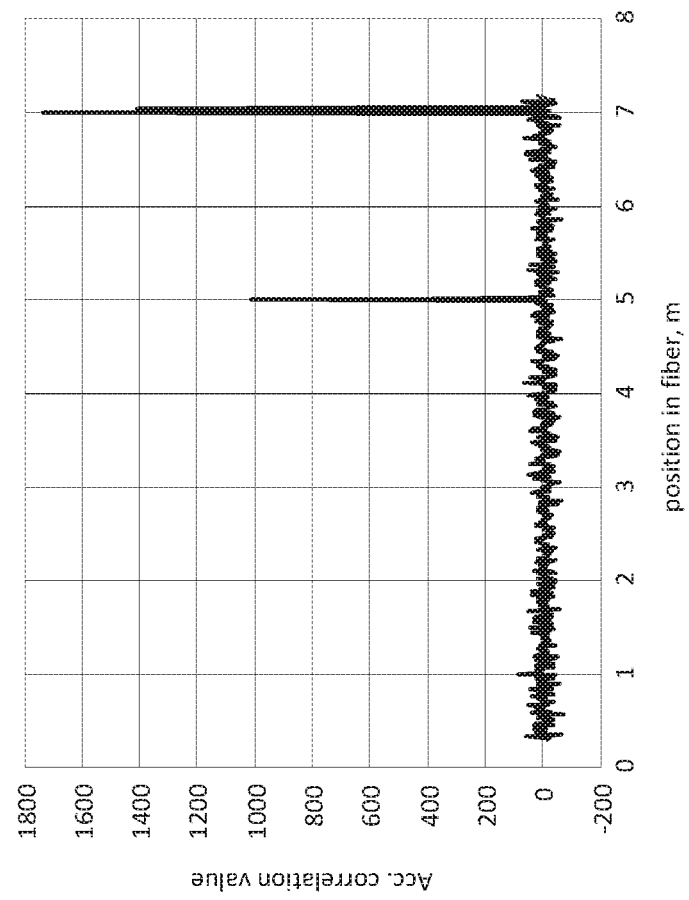

FIGS. 4A, 4B, 4C show a curve of a (discrete) correlation function. This curve has been simulated for a single-mode optical fiber 116 having a length of approx. 7 m and reflection points of −30 dB at 1.003 m, −20 dB at 5.000 m, −20 dB at 5.006 m, −16 dB at 7.000 m and −16 dB at 7.053 m, respectively. A 10 Gb/s PRBS of 127 bit length (raised cosine shaped pulses) has been used which corresponds to a bit duration of 100 ps and a spatial resolution of 10 mm. The sampling rate of the slicer 124 was equal to the bit rate of the probing signal $S_{opt}$.

FIG. 4A shows the discrete correlation function as a function of fiber length, i.e. the time values of the code sequences and thus the correlation function have been converted into position values taking into account the group velocity of the optical signals within the fiber 116. A relative linear scale is used for the vertical axis, i.e. for the values of the correlation function. The sampling phase $\varphi$ (relative to the optical return signal that has been detected) is 0 degree for the curve in FIGS. 4A, 4B, 4C. FIG. 4A shows the discrete correlation function for the whole fiber length and FIGS. 4B and 4C show enlarged areas of the curve around the peaks at approx. 5 m and 7 m, respectively.

FIGS. 5A, 5B, 5C show a similar simulation result for a phase position of $\varphi=180°$. It is apparent from FIGS. 4A, 4B, 4C and 5A, 5B, 5C that the sampling phase has a decisive influence on the discrete correlation function, especially on the position and height of the reflection peaks that can be determined using these discrete correlation functions (each of them alone).

Figure 6A:
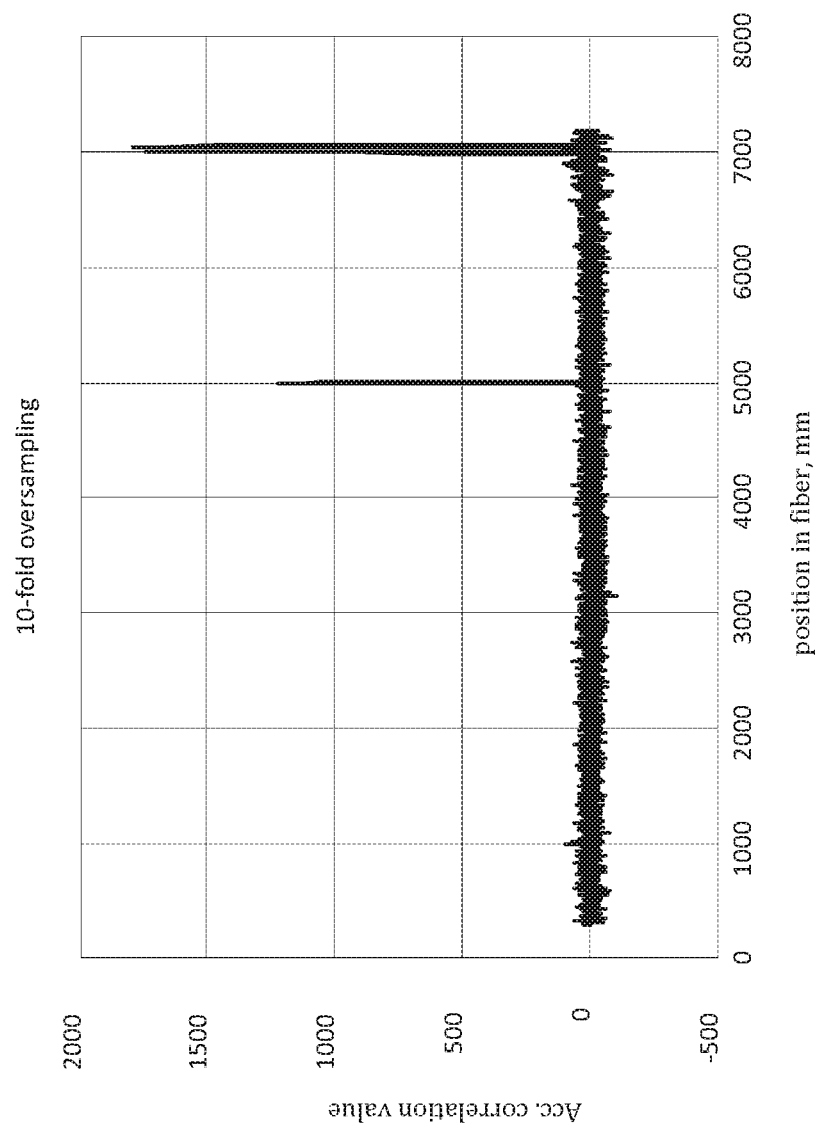
FIG. 6aA
Figure 6C:
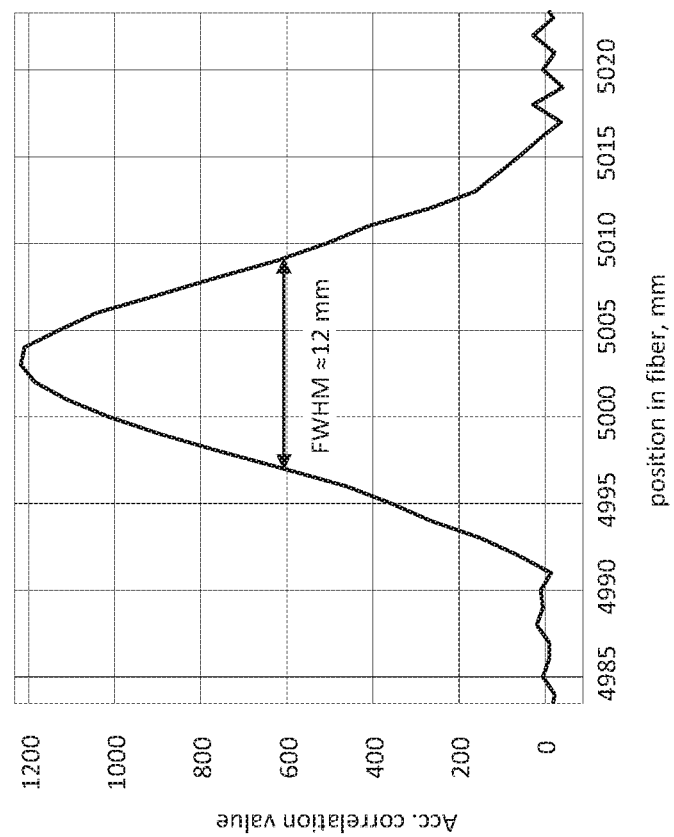
FIG. 6B and FIG. 6C show diagrams illustrating a similar simulation result as FIG. 4A, FIG. 4B and FIGS. 4C, and 5A, FIG. 5B and FIG. 5C, wherein 10-fold over-sampling is used (i.e. a bit is sampled and sliced at 10 different equally spaced phase positions)
Figure 6B:
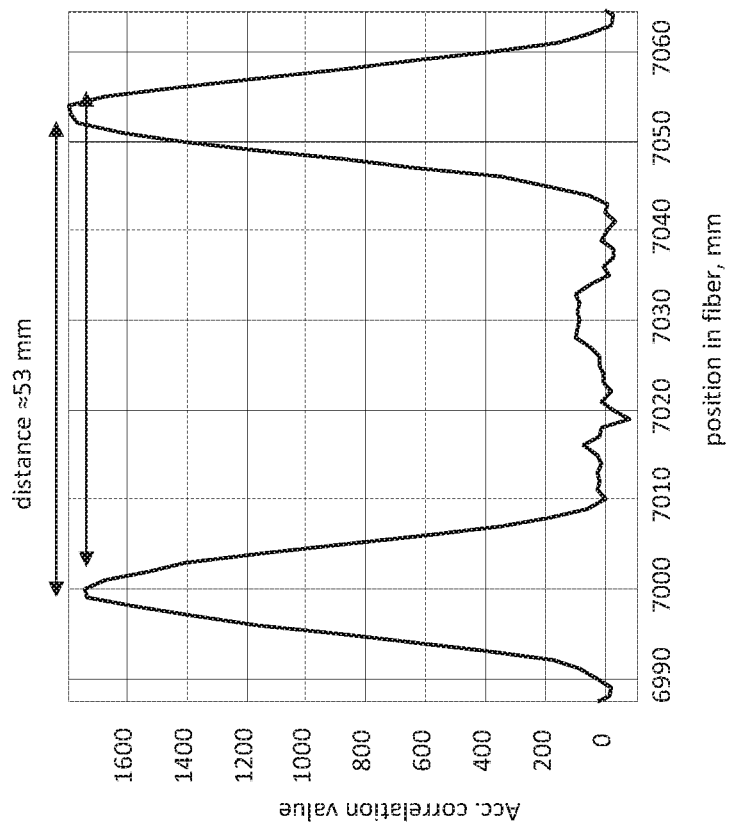

FIGS. 6A, 6B, 6C show a simulation result for the same fiber under the same conditions. However, 10-fold oversampling has been used in this case. It is clearly apparent from FIGS. 6B and 6C that the reflection peaks can be determined with much higher accuracy as compared to FIGS. 4 A, 4B, 4C and 5 A, 5B, 5C. This illustrates that the influence of the sampling phase can be reduced or even canceled if an appropriate oversampling is used or if receive code sequences for a sufficiently high number of phase positions are used for determining the discrete multi-phase correlation function.

It is further apparent from FIG. 6B that the reflection peaks at 7000 mm and 7053 mm, respectively, have a FWHM in the range of 10 mm which corresponds to the bit duration of 100 ps. This is an indication that the reflection is caused by a single reflection point within the fiber.

To the contrary, FIG. 6C shows a reflection peak with a FWHM of approximately 12 mm, which is a clear indication that this peak is caused by more than one reflection point within the fiber, namely, the reflection points at 5000 mm and 5006 mm, respectively.

The correlation functions shown in FIGS. 4A, 4B, 4C, 5A, 5B, 5C and 6A, 6B, 6C have already been filtered in order to suppress pre- and post-peak oscillations. However, no averaging has been applied in order to obtain these multi-phase correlation functions. Filtering can e.g. be performed by using a digital finite impulse response (FIR) filter that is realized by the filter 132 comprised by the DSP 126.

The influence of filtering the discrete correlation function is illustrated in FIGS. 7 and 8A, 8B, 8C. FIG. 7 shows a discrete multi-phase correlation function obtained by a simulation for the above example of a approx. 7 m long single-mode fiber. As apparent from the rather smooth shape of the curve in the regions outside of the peaks (and the respective pre- and post-oscillations), averaging has been applied. Further, rescaling the values of the transmit code sequence and the receive code sequences into the bias-free [−1;1] scale yielded positive and negative values of the correlation function, especially in the regions of the pre- and post-peak oscillations.

Filtering the curve in FIG. 7 by the filter 132 comprised by the DSP 126 so as to suppress or at least reduce the pre- and post-peak oscillations results in the curve shown in FIGS. 8A, 8B, 8C, wherein FIG. 8A shows the correlation curve for the whole fiber length and FIGS. 8B and 8C show an enlarged section of this curve comprising the overlapping peaks around approx. 5 m and the separated peaks around approx. 7 m, respectively. The filtering can be performed by using a filter characteristic or filter function having a impulse response corresponding to the inverse of the PRBS correlation response. Applying this filtering results in good single-event accuracy. However, close events may lead to overlapping reflection peaks in the correlation function, which form a single reflection peak having a single maximum. As a 10-fold oversampling, i.e. a 10-phase correlation function, is used, the filtered curve is essentially smooth in the regions of the peaks (see FIGS. 8b and 8c) so that applying additional curve fitting might not be necessary in order to determine the peak positions, i.e. the time-of-flight values with sufficient accuracy. It shall be mentioned that it would also be possible to filter the PRBS and then perform the correlation with the receive code sequence that has been detected as both operations are linear operations.

Figures 9A, 9B:
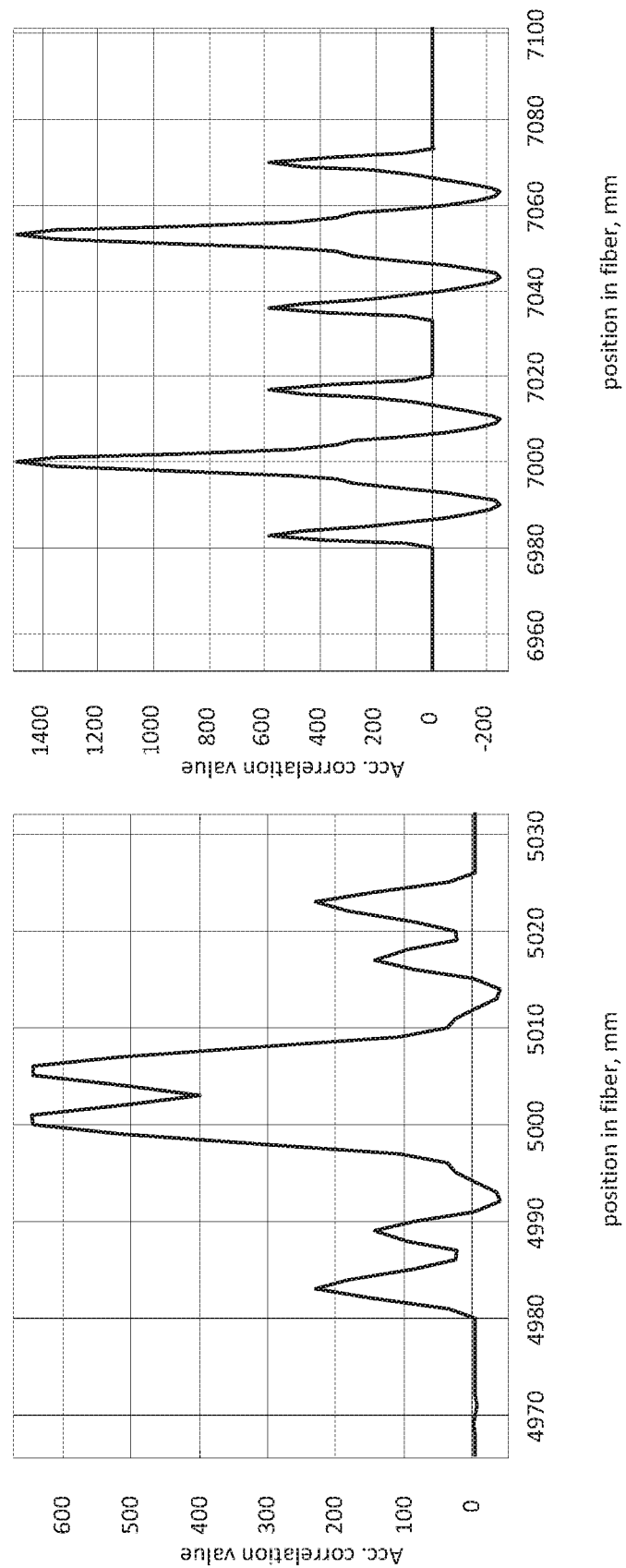
FIG. 9A and FIG. 9B show diagrams similar to FIG. 8B and FIG. 8C, wherein the respective multi-phase correlation function has been de-convoluted in order to separate overlapping peaks (FIG. 9A corresponds to FIG. 8B and FIG. 9B corresponds to FIG. 8C)

FIGS. 9a and 9b illustrate the influence of further applying a de-convolution method to the multi-phase correlation function that has been obtained. In this manner, closely neighboring peaks may be separated. As de-convolution is a known mathematical method, a more detailed explanation can be omitted at this point. A person skilled in the art will be able to choose a specific de-convolution method that results in an acceptable calculation or data processing effort and in a sufficient accuracy with respect to the desired separation of closely neighboring peaks and the determination of peak positions. For the simulation example shown in FIGS. 9A, 9B an FIR filter, more precisely, a 21-tap FIR filter was applied in order to perform an appropriate de-convolution.

As apparent from FIG. 9A, by applying de-convolution, the peaks at 5.000 m and 5.006 m can be resolved, despite the fact that the bit duration of the probing signal corresponds to a fiber length of 10 mm and the distance between the peaks is 6 mm only. After de-convolution, the peaks at 7.000 m and 7.053 m are still clearly identifiable as shown in FIG. 9B. However, as apparent from FIGS. 9A and 9B, de-convolution must be applied in an appropriate manner as pre- and post-peak oscillations are produced.

Figures 10B, 10C:
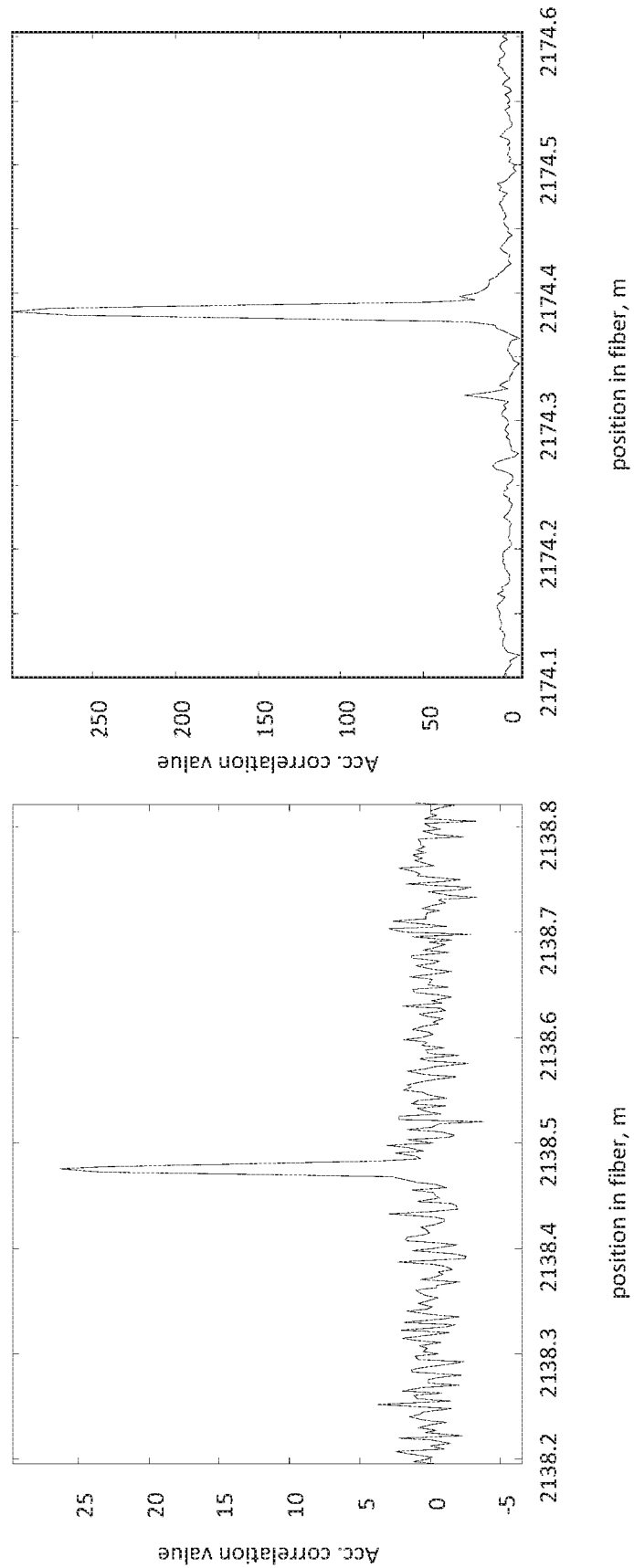

FIGS. 10A, 10B, 10C show a measurement result that has been obtained for a single-mode fiber (G.652D fiber) of approximately 2200 m length. The measurement has been performed using 4-fold oversampling, i.e. a 4-phase correlation function has been determined by determining receive code sequences at four different phase positions for the same electrical return signals. A 127 bit PRBS has been used for creating the optical probing signals $S_{opt}$. The bit rate was 10 Gb/s. In this measurement example, averaging has been applied, wherein 999 runs were used for obtaining averaged receive code sequences for each of the four phase positions. Instead of a mirror at the far end of the fiber, as shown in FIG. 1A, 1B, an optical circulator was used in order to "reflect" the optical probing signal.

The respective discrete 4-phase correlation function shown in FIG. 10A, which shows a first peak at approx. 2138.5 m and a second peak at 2174.4 m, has been obtained by gating, i.e. by merely sampling the electrical return signal $R_{el}$ for a desired range of the time-of-flight or a corresponding range of the fiber length. As apparent from FIGS. 10A, 10B, 10C, the range between approx. 2132 m and 2204 m has been measured by applying gating, i.e. after having created a probing signal and supplied it to the fiber under test 116, the sampling process (i.e. sampling the respective electrical return signal $R_{el}$) has been started with a delay of approx. 21.32 ps and stopped at a delay of approx. 22.04 ps. Of course, the delay of 21.32 ps must be added to the time-of-flight (RTT) that is determined from the peak position(s) using the multi-phase correlation function (here: the 4-phase) correlation function.

As a sufficiently high noise component must be comprised by the electrical return signals $R_{el}$, i.e. the electrical return signal must reveal a sufficiently low SNR (see above), the method of adding a noise signal $S_N$ to the electrical return signal $R_{el}$ may be configured in such a way that the amplitude or power of the noise signal is dependent on the gating interval (i.e. the time-of-flight (RTT) interval or the corresponding range of the optical path under test 116). As an electrical return signal corresponding to an optical return signal that is reflected from positions of the optical path under test closer to its near end will comprise higher signal values than an electrical return signal corresponding to an optical return signal that is reflected from more distant positions, a noise signal having a higher amplitude or higher power may be added to the electrical return signal in the first case and a noise signal having a lower amplitude or lower power may be added to the electrical return signal in the latter case. As the SNR of the electrical return signal should be sufficiently low in the whole gating range (defined by a start and end value of the RTT or the position of the optical path under test), the noise signal may be chosen in such a way that the maximum SNR of the (combined) electrical return signal is given in the whole range.

If a long optical path is to be examined, the whole length may be divided into two or more sections and an appropriate gating may be applied to measure each of the section, wherein for each section an appropriate amount of noise is added to the electrical return signal.

Instead of or in addition to adding a noise signal $S_N$ to the electrical return signal, the signal detector 104 may comprise a variable optical attenuator which may be configured to be controllable by the signal detector 104 or the control device 108, respectively. The optical attenuation may be controlled depending on the gating range in such a way that an optical signal having a sufficiently low SNR is produced, i.e. that the reflected signal power is adapted to the gating range. In this way, a SNR near its optimum value below 0 dB can be maintained.

Of course, gating generally helps to reduce the amount of data to be processed and thus the processing time by limiting the observation range. For example, sampling a fiber with a length of 20 km at a sampling rate of 10 Gb/s (resulting in a resolution of 5 mm) would result in 4 million sampling points to be processed in parallel and in increased hardware and processing effort and cost.

The correlation curves in FIG. 10B and FIG. 10C show the two peaks in FIG. 10A at higher resolution. Curve fitting using Gaussian fit revealed values of 2138.4749 m and 2174.3854 m. The accuracy and reproducibility that could be obtained using the method according to the invention was better than 1 mm (corresponding to 5 ps (half RTT)). The (relative) values of the correlation peaks determined were 26.32 and 300.02, respectively.

Up to now, a sufficient linearity of the probability of a "one" decision of the slicing process and thus a sufficient linearity of the (normalized) value of the correlation peak (see equation 4) was obtained under the prerequisite of a sufficient noise, especially Gaussian white noise, so that the SNR of the (combined) electrical return signal $R_{el}$ is sufficiently low, especially in the region of 0 dB or lower. If the SNR was too high, an additional noise component was added (as the case may be, dependent on the gating range) in order to fulfill this requirement.

Now, it will be demonstrated that a similar result can be achieved by adding a deterministic signal, i.e. a signal determined by a completely specified function of time, to an electrical return signal revealing (before modification) a high SNR.

FIG. 11 shows a schematic representation of a block diagram of the main components of a correlation OTDR 200 which realizes this method. The majority of components of the correlation OTDR 200 and the correlation OTDR 100 according to FIG. 1 is practically identical. Thus, identical or practically identical components are referred to by identical reference signs. The decisive difference between the devices according to FIGS. 1 and 11 is that instead of a noise generator 122 a deterministic signal generator 222 is provided, which is configured to be controllable by the control device 108. The signal generator 222 is adapted to generate a deterministic signal $S_D$, e.g. a signal revealing a constant signal value during the detection period of an electrical return signal $R_{el}$ (that corresponds to a given optical probing signal $S_{opt}$).

The deterministic signal is created in such a way that, over a plurality of probing signals (i.e. the detection of a corresponding plurality of electrical return signals), a uniform density distribution of sampled and sliced 0 and 1 bits is achieved. This may especially be achieved by using a deterministic signal that is derived from a signal slope, e.g. a linear voltage slope between a minimum and a maximum value.

FIG. 12 shows density distributions of sliced signal values of a plurality of electrical return signal $R_{el}$, wherein a varying constant signal value has been added to each electrical return signal in such a way that linear distributions for 0 bits having a center value $C_0$ (shown by the dashed line) and 1 bits having a center value of $C_1$ (shown by the dotted line) are created. The density distributions are created in such a way by choosing desired values for the constant signal value of the deterministic signal $S_D$ that they overlap or that there is at least no gap between the two distributions.

An overlap of the distributions for the 0 and 1 bits is granted if a minimum value of this linear function or dependency is less than or equal to minus half of the absolute value of the difference of the signal value for a 1 bit and the signal value of a 0 bit of the sequence of pulses in the electrical return signal received and a maximum value of this linear function is greater than or equal to the absolute value of this difference.

It can be shown that the correlation peak of a one decision is $$CC_{peak} = [p(one|one) - p(one|zone)] = \frac{C_1 - C_0}{\sigma} \quad \text{(equation 6)}$$

as long as the threshold S lies within the distributions, wherein $\sigma$ designates the width of the distributions. As apparent from equation 6, also in this case the correlation peak value is independent of the threshold value S and linearly depends on the difference of the center values $C_1$ and $C_0$. As a result, essentially all the above explanations and advantages with respect to the embodiment using a combined electrical return signal $R_{el}$ having a sufficient noise component also apply to this embodiment in which a deterministic signal is added to the electrical return signal $R_{el}$, wherein a plurality of optical probing signals, i.e. a plurality of electrical return signals $R_{el}$, are used for a measurement. Averaging is used in this embodiment.

As already mentioned, the method of using a plurality of optical probing signals $S_{opt}$ and evaluating a corresponding plurality of electrical return signals $R_{el}$, wherein a deterministic signal is added to the electrical return signals $R_{el}$ in such a way that essentially uniform density distributions of the sliced signal values for the 0 and 1 bits are obtained, may be used independently of the method of multi-phase sampling. Of course, all reasonable combinations of this method of adding a deterministic signal with other features described above in connection with the multi-phase sampling embodiment are possible. Especially, the variation of the deterministic signal may be made dependent on the gating range.

In a further embodiment, instead of adding a deterministic signal, the slicing threshold S is varied over a plurality of probing signals or electrical return signals, respectively. As explained above, the threshold is varied in such a way that a uniform density distribution is obtained between the signal amplitude of the electrical return signal received and the slicing (decision) threshold S. In order to realize this embodiment, in the embodiment according to FIG. 1A, 1B the noise generator 122 may be omitted and the slicer 124 may be configured to be controllable by the control device 108 in such a way that the desired variation of the slicing threshold S is possible for the plurality of probing signals $S_{opt}$.

As already mentioned, also this method of varying the slicing threshold S as described above may be used independently of the method of multi-phase sampling. Of course, all reasonable combinations of this method of adding a deterministic signal with other features described above in connection with the multi-phase sampling embodiment are possible. Especially, the variation of the slicing threshold may be made dependent on the gating range.

In all embodiments described above, generally the transmission of a burst of pulses according to a transmit code sequence would be sufficient to implement the high-resolution measurement. However, the relatively long idle period, in which no optical probing signal is transmitted and in which the optical return signal $R_{opt}$ is detected, might induce a bias wander at the transmitter due to a low-frequency cutoff of the electronic components. It might therefore be helpful to transmit a second ("idle") sequence, whose cross-correlation with the burst of pulses according to the transmit code sequence is zero or close to zero. If possible, the idle sequence shall be bias-free.

LIST OF REFERENCE SIGNS 100 correlation OTDR
102 signal transmitter
104 signal detector
106 signal processing device
108 control device
110 display
112 optical path separator/optical circulator
114 connection port
116 optical path under test
118 mirror
120 adder
122 noise generator
124 slicer
126 digital signal processor (DSP)
128 averaging unit
130 correlator device
132 filter
222 deterministic signal generator
$S_{opt}$ optical probing signal
$R_{opt}$ optical return signal
$R_{el}$ electrical return signal
$S_N$ noise signal
$S_D$ deterministic signal

The invention claimed is:

1. A method of determining a time-of-flight of an optical signal between a starting point of an optical path and a reflection point within the optical path, the method comprising the steps of
   (a) supplying to the optical path at least one binary optical probing signal comprising a sequence of pulses according to a binary transmit code sequence, the sequence of pulses having a predetermined bit duration, phase and bit rate;
   (b) detecting at least one electrical return signal according to at least one optical return signal returning from the optical path in response to a corresponding one of the at least one optical probing signals using direct detection;
   (c) deriving at least one receive code sequence by sampling and slicing the at least one electrical return signal, wherein a sampling rate corresponding to the bit rate of the sequence of pulses of the at least one optical probing signal is used;
   (d) determining a correlation function by correlating the transmit code sequence and the at least one receive code sequence; and
   (e) identifying a main peak of the correlation function that corresponds to the reflection point and a time position of the main peak, and determining the time-of-flight as the time position of the main peak;
   wherein
   (f) two or more receive code sequences are derived
      (i) from one or more electrical return signals, wherein at least two receive code sequences are generated by sampling and slicing the same one of the one or more electrical return signals at different phase positions, and/or
      (ii) from two or more electrical return signals, wherein at least two receive code sequences are generated by sampling and slicing different ones of the two or more electrical return signals at different phase positions,
   (g) wherein a multi-phase correlation function is determined by
      (i) calculating, for each receive code sequence that has been determined for a given phase position, values of a discrete correlation function by correlating the respective receive code sequence and the transmit code sequence of the corresponding optical probing signal, and
      (ii) interleaving the values of at least two discrete correlation functions according to their respective phase position, or by
      (iii) interleaving the receive code sequences that have been determined for different phase positions according to their respective phase position in order to create an interleaved receive code sequence, and creating an interleaved transmit code sequence by interleaving a number of transmit code sequences that corresponds to the number of different phase positions, and
      (iv) correlating the interleaved receive code sequence and the interleaved transmit code sequence, and
   (h) wherein the multi-phase correlation function is used to identify the main peak that corresponds to the reflection point.

2. The method according to claim 1, wherein the at least one electrical return signal comprises a noise component having a probability density function having a standard deviation greater than or equal to four times the average signal value of the at least one electrical return signal.

3. The method according to claim 1, wherein a curve fitting method is used in order to create a function of time comprising or approximating selected points of the multi-phase correlation function in region of the main peak, and wherein a maximum of the function of time is determined and a time position of the maximum is interpreted as the time-of-flight.

4. The method according to claim 3, wherein a Gaussian curve is fitted to the selected points of the multi-phase correlation function in the region of the main peak.

5. The method according to claim 1, wherein a plurality of identical optical probing signals is used to determine each of the discrete correlation functions, wherein a plurality of receive code sequences is derived by sampling and slicing respective electrical return signals at the same phase positions, wherein bit values of corresponding bits of the receive code sequences are averaged in order to create an averaged receive code sequence and wherein the averaged receive code sequence is used to determine the discrete correlation functions by correlating the averaged receive code sequence and the respective transmit code sequence of the corresponding optical probing signals.

6. The method according to claim 1, wherein a plurality of identical optical probing signals is used, wherein a constant decision threshold is used for performing the slicing of the sampled values and a constant value is added to each of the respective electrical return signals, and wherein the constant values have a uniform amplitude distribution over all electrical return signals.

7. The method according to claim 6, wherein the uniform distribution of the constant values is obtained by using a linear function or dependency for the constant value, wherein a minimum value of this linear function is less than or equal to minus half of the absolute value of the difference of the signal value for a 1 bit and the signal value of a 0 bit of the sequence of pulses in the at least one electrical return signal received and a maximum value of this linear function is greater than or equal to the absolute value of this difference, and wherein the constant decision threshold lies within the distribution of the sampled values.

8. The method according to claim 7, wherein the minimum and the maximum value of the linear function are determined by choosing predetermined fixed values depending on approximate values for 0 and 1 bits included in the at least one electrical return signal.

9. The method according to claim 1, wherein a plurality of identical optical probing signals is used and a variable decision threshold is used for performing the slicing of the sampled values, wherein the decision threshold is kept constant for slicing the sampled values of the at least one electrical return signals, wherein the decision threshold is varied between a minimum value and a maximum value, and wherein values of the variable decision threshold have a uniform distribution over all electrical return signals.

10. The method according to claim 1, wherein the multi-phase correlation function is filtered in such a way that pre-peak and post-peak oscillations within the multi-phase correlation function are cancelled or at least reduced.

11. The method according to claim 1, wherein a deconvolution of at least a selected part of the correlation function comprising the main peak is carried out in order to separate potentially overlapping peaks that form the main peak.

12. The method according to claim 1, wherein the sampling and slicing of the at least one electrical return signal is restricted to a predetermined sampling time interval and wherein a time delay between a start time of the predetermined sampling time interval and a respective start time of the sequence of pulses of the respective optical probing signal is taken into account when determining the time-of-flight.

13. A device for determining a time-of-flight of an optical signal between a starting point of an optical path and a reflection point within the optical path, the device comprising
 (a) a signal transmitter adapted to create at least one binary optical probing signal comprising a sequence of pulses according to a binary transmit code sequence, the sequence of pulses having a predetermined bit duration, phase and bit rate; and to supply the at least one optical probing signal to a near end of the optical path,
 (b) a signal detector adapted to detect at least one electrical return signal according to at least one optical return signal returning from the optical path in response to a corresponding one of the at least one optical probing signal using direct detection,
 (c) a signal processing device adapted
  (i) to derive at least one receive code sequence by sampling and slicing the at least one electrical return signal, wherein a sampling rate corresponding to the bit rate of the sequence of pulses of the at least one optical probing signal is used;
  (ii) to determine a correlation function by correlating the transmit code sequence and the at least one receive code sequence; and
  (iii) to identify a main peak of the correlation function that corresponds to the reflection point and a time position of the main peak, and to determine the time-of-flight as the time position of the main peak; and
 (d) a control device for controlling functions of the signal transmitter, the signal detector and the signal processing device
wherein
 (e) the signal processing device is further adapted
  (i) to derive two or more receive code sequences
   (1) from one or more electrical return signals, wherein at least two receive code sequences generated by sampling and slicing the same one of the one or more electrical return signals at different phase positions, and/or
   (2) from two or more electrical return signals, wherein at least two receive code sequences are generated by sampling and slicing different ones of the two or more electrical return signals at different phase positions,
  (ii) to determine, for each receive code sequence that has been determined for a given phase position, values of a discrete correlation function by correlating the respective receive code sequence and the transmit code sequence of the corresponding optical probing signal,
  (iii) to interleave the values of at least two discrete correlation functions according to their respective phase position in order to create a multi-phase correlation function, and
  (iv) to use the multi-phase correlation function for identifying the main peak that corresponds to the reflection point.

14. The device according to claim 13, wherein a noise generator is provided which is adapted to generate a Gaussian white noise signal and the Gaussian white noise signal is added to the at least one electrical return signal by a signal adder.

15. The device according to claim 13, wherein the control device and the signal processing device are configured such that the at least one electrical return signal comprises a noise component having a probability density function having a standard deviation greater than or equal to four times the average signal value of the at least one electrical return signal.

16. The device according to claim 13, wherein a deterministic signal generator is provided which is adapted to generate a deterministic signal, and the deterministic signal is added to the at least one electrical return signal by a signal adder.

17. The device according to claim 13, wherein the signal processing device is controllable with respect to a slicing threshold that is applied for sampling and slicing the at least one electrical return signal.

18. The device according to claim 13, wherein the control device and the signal processing device are configured such that a curve fitting method is used in order to create a function of time comprising or approximating selected points of the multi-phase correlation function in a region of the main peak, that a maximum of the function of time is determined and a time position of the maximum is interpreted as the time-of-flight.

19. The device according to claim 18, wherein the control device and the signal processing device are configured such that a Gaussian curve is fitted to the selected points of the multi-phase correlation function in the region of the main peak.

20. The device according to claim 15, wherein the control device and the signal processing device are configured such that a plurality of identical optical probing signals is used to determine each of the discrete correlation functions, wherein a plurality of receive code sequences is derived by sampling and slicing respective electrical return signals at the same phase positions, wherein bit values of corresponding bits of the receive code sequences are averaged in order to create an averaged receive code sequence and wherein the averaged receive code sequence is used to determine the discrete correlation functions by correlating the averaged receive code sequence and the respective transmit code sequence of the corresponding optical probing signals.

21. The device according to claim 15, wherein the control device and the signal processing device are configured such that the multi-phase correlation function is filtered such that pre-peak and post-peak oscillations within the multi-phase correlation function are cancelled or at least reduced.

22. The device according to claim 15, wherein the control device and the signal processing device are configured such that a deconvolution of at least a selected part of the correlation function comprising the main peak is carried out in order to separate potentially overlapping peaks that form the main peak.

23. The device according to claim 15, wherein the control device and the signal processing device are configured such that the sampling and slicing of the at least one electrical return signal is restricted to a predetermined sampling time interval and time delay between a start time of the sampling time interval and a respective start time of the sequence of pulses of the respective optical probing signal is taken into account when determining the time-of-flight.

24. The device according to claim 16, wherein the control device and the signal processing device are configured such that a plurality of identical optical probing signals is used, and a constant decision threshold is used for performing the slicing of the sampled values and a constant value is added to each of the respective electrical return signals, wherein the constant values have a uniform amplitude distribution over all electrical return signals.

25. The device according to claim 24, wherein the control device and the signal processing device are configured such that the uniform distribution of the constant values is obtained by using a linear function or dependency for the constant value, wherein a minimum value of this linear function is less than or equal to minus half of the absolute value of the difference of the signal value for a 1 bit and the signal value of a 0 bit of the sequence of pulses in the at least one electrical return signal received and a maximum value of this linear function is greater than or equal to the absolute value of this difference, and wherein the constant decision threshold lies within the distribution of the sampled values.

26. The device according to claim 25, wherein the control device and the signal processing device are configured such that the minimum and the maximum value of the linear function are determined by choosing predetermined fixed values depending on approximate values for 0 and 1 bits included in the at least one electrical return signal.

27. The device according to claim 24, wherein the control device and the signal processing device are configured such that pre-peak and post-peak oscillations within the multi-phase correlation function are cancelled or at least reduced.

28. The device according to claim 24, wherein the control device and the signal processing device are configured such that a deconvolution of at least a selected part of the correlation function comprising the main peak is carried out in order to separate potentially overlapping peaks that form the main peak.

29. The device according to claim 24, wherein the control device and the signal processing device are configured such that the sampling and slicing of the at least one electrical return signal is restricted to a predetermined sampling time interval and a time delay between the start time of the sampling time interval and a respective start time of the sequence of pulses of the respective optical probing signal is taken into account when determining the time-of-flight.

30. The method according to claim 1, wherein an additional noise component is added to the at least one electrical return signal in order to create a total noise component of the at least one electrical return signal having a probability density function having a standard deviation greater than or equal to four times the average signal value of the at least one electrical return signal.

31. The method according to claim 11, wherein the deconvolution is carried out when a full-width at half maximum of the main peak is greater than a predetermined value depending on the bit duration of the sequence of pulses of the optical probing signal.

32. The device according to claim 13, wherein the control device and the signal processing device are configured such that an additional noise component is added to the at least one electrical return signal in order to create a total noise component of the at least one electrical signal having a probability density function having a standard deviation greater than or equal to four times the average signal value of the at least one electrical return signal.

33. The device according to claim 22, wherein the control device and the signal processing device are configured such that the deconvolution is carried out when a full-width at half maximum of the main peak is greater than a predetermined value depending on a bit duration of the sequence of pulses of the optical probing signal.

34. The device according to claim 28, wherein the control device and the signal processing device are configured such that the deconvolution is carried out when a full-width at half maximum of the main peak is greater than a predetermined value depending on a bit duration of the sequence of pulses of the optical probing signal.

* * * * *